(12) United States Patent
Wandel et al.

(10) Patent No.: US 12,448,231 B2
(45) Date of Patent: Oct. 21, 2025

(54) TUBE-CARRIER BASED LOGISTICS SYSTEM AND METHOD FOR PERFORMING LOGISTICS SERVICES WITH SUCH SYSTEM

(71) Applicant: Omniloop AB, Varberg (SE)

(72) Inventors: Sten Wandel, Varberg (SE); Fredrik Eng Larsson, Stockholm (SE); Andreas Wells, Trångsund (SE); Sofia Ohnell, Gothenburg (SE); Anders Johnson, Gothenburg (SE)

(73) Assignee: Omniloop AB, Varberg (SE)

( * ) Notice: Subject to any disclaimer, the term of this patent is extended or adjusted under 35 U.S.C. 154(b) by 71 days.

(21) Appl. No.: 18/001,735

(22) PCT Filed: Jun. 23, 2021

(86) PCT No.: PCT/EP2021/067175
§ 371 (c)(1),
(2) Date: Dec. 14, 2022

(87) PCT Pub. No.: WO2021/260019
PCT Pub. Date: Dec. 30, 2021

(65) Prior Publication Data
US 2023/0267403 A1  Aug. 24, 2023

(30) Foreign Application Priority Data
Jun. 23, 2020 (SE) .................................... 2050744-8

(51) Int. Cl.
*B65G 54/02* (2006.01)
*B65G 51/04* (2006.01)
*G06Q 10/0832* (2023.01)

(52) U.S. Cl.
CPC ........... *B65G 54/025* (2013.01); *B65G 51/04* (2013.01); *B65G 2201/02* (2013.01); *G06Q 10/0832* (2013.01)

(58) Field of Classification Search
None
See application file for complete search history.

(56) References Cited

U.S. PATENT DOCUMENTS 714,865 A * 12/1902 Collis ................... B65G 51/24
406/84
2,913,198 A    11/1959 Bonbrake
(Continued)

FOREIGN PATENT DOCUMENTS

CN  105984724 A  10/2016
CN  105984725 A  10/2016

OTHER PUBLICATIONS

Anonymous, "Pneumatic tube—Wikipedia", May 27, 2020, 10 pages, retrieved from the Internet: URL:https://en.wikipedia.org/w/index.php?title=Pneumatic_tube&oldid=959145426.
(Continued)

*Primary Examiner* — William R Harp
(74) *Attorney, Agent, or Firm* — Capitol City TechLaw

(57) ABSTRACT

A logistics service system (10) comprising at least one tube (14, 16, 43) connecting at least one terminal (11, 12, 70), at least one carrier (17) configured to hold goods (48) to be handled in the logistics service system (10), at least one switching device (51) arranged to connect at least two of said tubes (14, 16, 43), and configured to redirect said carrier (17) from one of said tubes into another of said tubes, at least one means for propulsion (15) of the at least one carrier (17) in said tube (14, 16, 43), at least one control unit (29, 50), and wherein all above being configured to produce logistics services that includes both storing and transport functions.

22 Claims, 12 Drawing Sheets

(56) References Cited

U.S. PATENT DOCUMENTS

| | | | | |
|---|---|---|---|---|
| 3,337,159 | A * | 8/1967 | Hoehmann | B65G 47/5104 |
| | | | | 406/182 |
| 4,023,500 | A * | 5/1977 | Diggs | B61B 13/10 |
| | | | | 406/185 |
| 6,374,746 | B1 * | 4/2002 | Fiske | B61B 13/08 |
| | | | | 104/282 |
| 6,659,014 | B2 * | 12/2003 | Chaabi | B61B 13/10 |
| | | | | 105/155 |
| 9,592,969 | B2 * | 3/2017 | Wolfe | B65G 51/44 |
| 9,630,787 | B2 * | 4/2017 | Valerino, Sr. | G16C 99/00 |
| 10,867,457 | B1 * | 12/2020 | McCracken, Jr. | G06K 7/1413 |
| 11,482,314 | B1 * | 10/2022 | Lingelbach | G06F 21/35 |
| 11,858,756 | B2 * | 1/2024 | Faizan | B65G 51/44 |
| 2002/0062759 | A1 | 5/2002 | Chaabi | |
| 2006/0011093 | A1 | 1/2006 | Jensen et al. | |
| 2011/0076104 | A1 * | 3/2011 | Ersoy | B65G 51/24 |
| | | | | 406/34 |

OTHER PUBLICATIONS

Anonymous, "Vactrain—Wikipedia", Jun. 8, 2020, 5 pages, retrieved from the Internet: URL:https://en.wikipedia.org/w/index.php?title=Vactrain&oldid=961363551.

* cited by examiner

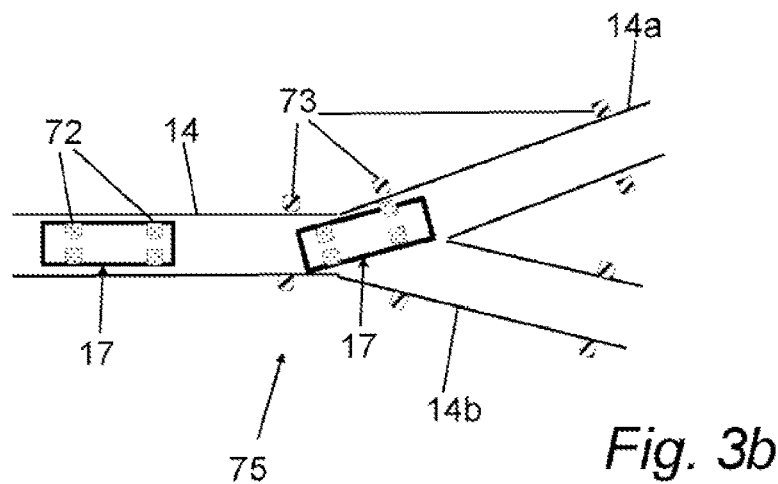
Fig. 3b
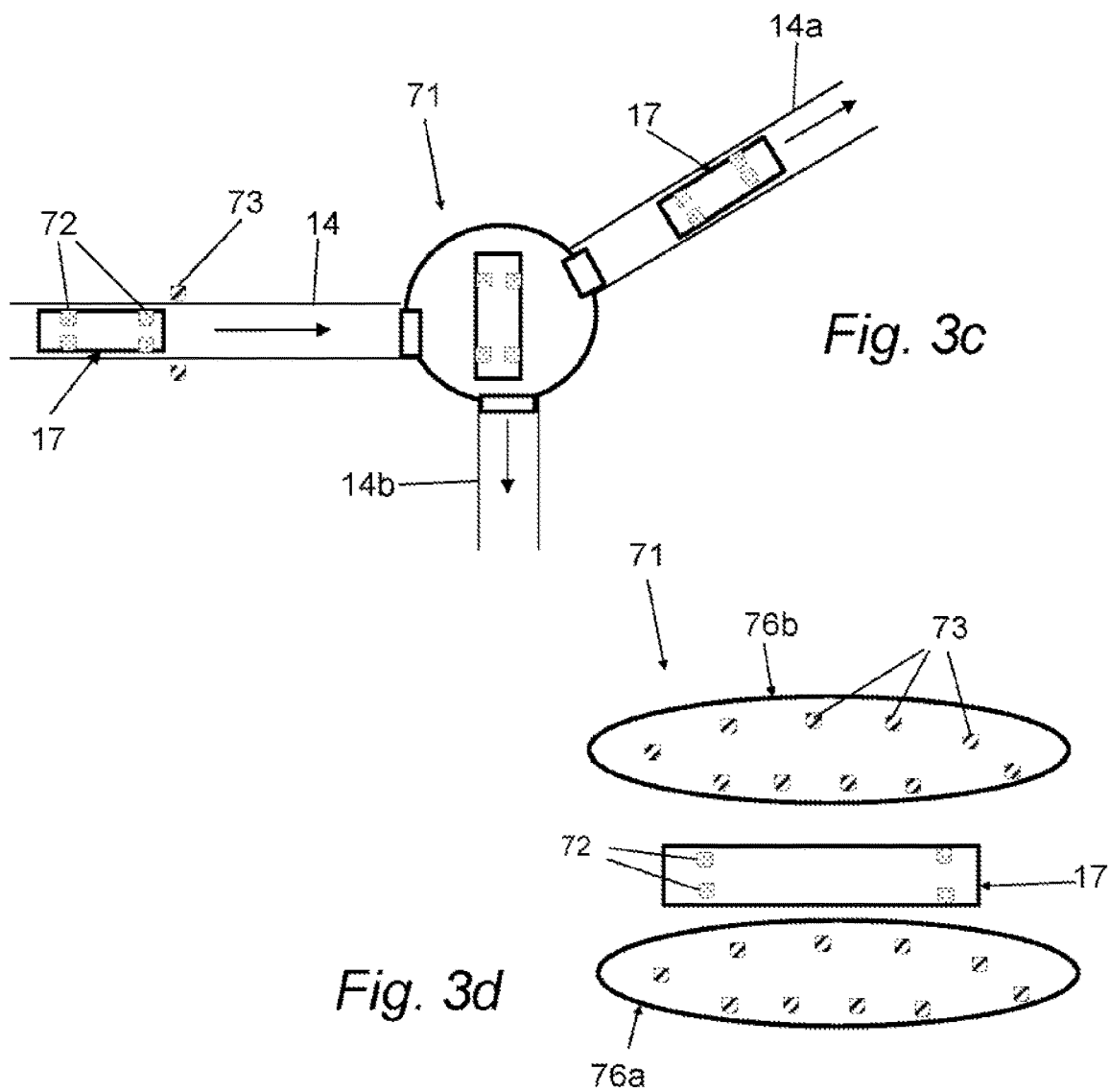
Fig. 3c
Fig. 3d

TUBE-CARRIER BASED LOGISTICS SYSTEM AND METHOD FOR PERFORMING LOGISTICS SERVICES WITH SUCH SYSTEM

This application claims priority under 35 USC 119(a)-(d) to SE patent application No. 2050744-8, which was filed on Jun. 23, 2020, the entire contents of which are incorporated herein by reference.

TECHNICAL FIELD

This invention relates to systems and methods for transporting items from one location to another.

BACKGROUND

Tube-carrier systems, also referred to as capsule pipeline systems, are well-known means for automatic transport of objects between a multitude of locations, any of which may be the origination location or destination location of the transport carrier.

Logistics, also referred to as supply chain management, refers to the overall processes to plan, acquire, store, and resources and products between the sources and nodes in the value chain, to the final consumer, and the reversed or circular flows back into and/or through the value chain, and associated information processes. A logistics service refers to a service acquired or used by an actor to perform or support one or several of these processes.

Systems using simple carriers such as plastic or paper bags are widely used for handling and removal of solid waste in residential areas, where differences in air pressure, pneumatic, provided with blowers are used for propulsion.

Wet and liquid waste such as faeces and urine from toilets and food waste from garbage disposals from households are removed together with water that has been used for bath, laundry, and dish washing in sewage pipes. Frying oil from restaurants are collected in containers that are removed by truck.

Systems using hard capsules as carriers are commonly used for transportation of samples to labs, blood bags, and sterile instruments in many hospitals, transport of money in retail, samples and components in industries, and during the 19:th and 20:th century for carrying mail between post offices in many larger cities.

The most common means for propulsion of these carriers in tubes with a diameter of up to 50 cm is pneumatics with blowers. For automatic transport of freight in tubes with a diameter over 1 meter, wheels on the carrier or on the inside wall of the tube are used for propulsion and to keep the distance to the inner walls. Linear electric motors for propulsion have been developed but are still uncommon in commercially available systems. For automatic transport in tunnels of freight pallets or containers, other carriers such as pods and AGVs with rubber or steel wheels and also with magnetic levitation and propulsion have been developed but are not yet commercially available.

In built-up areas there are many separate types of pipes, tubes, and cables underground, above ground and in buildings.

Current pneumatic tube systems for solid household waste removal cannot take all fractions of waste. Glass, metal, paper, batteries, light bulbs, cardboard, and wet fractions must be handled in a traditional parallel system. The bags often break causing odour and making it impossible to keep the different fractions apart, which makes the further handling and recycling of the waste difficult. The contents of the broken bags obstruct other bags resulting in that bags get stuck in the tube, effectively stopping the system to perform its intended function.

The current praxis of mixing many fractions of wet and liquid waste such as faeces, urine, food waste, and far too often oil, with "grey" water (that could be used for irrigation after minimal treatment), makes the treatment of sewage cumbersome and hinders the recovery of energy and the circulation of biological nutrients for plants.

For transportation of small objects such as parcels and shopping bags in cities, cars, vans, and trucks are currently the dominating means of conveyance. These occupy valuable city space, require large amounts of energy, and cause emissions of greenhouse gases, noise, and harmful particles. Many new systems have been proposed. Examples include drones, sidewalk robots, and movable delivery boxes.

Presently existing transport praxis use already crowded infrastructure (streets, sidewalks, or airspace), are not safe, are noisy, are not fully automated (require remote drivers and/or personnel for loading and unloading), do not carry the object the last and first 200 m, and allow for limited control of the carrier in time and space. All of the above also prevents advanced logistics allocation schemes such as real time allocation-in-transit, merge-in-transit, horizontal transshipment, and pre-positioning of merchandises in speculation.

Current praxis is to store small objects as shoes, cloths, tools, toys, books, electronics, food, beverages and pharmaceuticals at site of production, in distribution centers, retail outlets/stores/shops, and in homes in wardrobes; fridges; freezers; attic; or basement, or in rented externa storages/warehouses.

Such storing small objects results in that they occupy valuable space in buildings that could be used for other purposes, that it is cumbersome and resource demanding to place and retrieve stored objects, and difficult to keep track of them and their status and quality.

Current praxis for reversed or circular flows of products and waste back into the supply chain makes it cumbersome for producers, wholesalers, retailers, consumers, circular service companies, and waste handling companies to sort items for cleaning, refurbishing, reusing a second time, disassembling and reuse parts, material recycling, energy recycling, and final deposition.

Current transport, storing, and recycling praxis may result in deterioration of object quality due to wrong temperature; environment; or handling, fire, damage to adjacent objects, or antagonistic risks as theft, diversion, exchange with fakes, dilution, placing bombs or biological hazardous substances in the object; its packeting; or load unit, or sabotage of vehicles or of conveying infrastructure.

Current praxis of installing pipes and cables underground and in buildings make it cumbersome to inspect, repair, exchange or remove them, and to install pipes and cables using new technologies as tubes for hydrogen, tube-carrier systems, next generation of district heating/cooling, or future telecom cables.

From the above it is understood that there is room for improvement and the invention aims to solve or at least mitigate some existing drawbacks as well as other problems.

SUMMARY

The invention is defined by the appended independent claims. Additional features and advantages of the concepts disclosed herein are set forth in the description which follows, and in part will be obvious from the description, or may be learned by practice of the described technologies. The features and advantages of the concepts may be realized and obtained by operating the instruments and combinations particularly pointed out in the appended claims. These and other features of the described technologies will become more apparent from the following description and appended claims or may be learned by the practice of the disclosed concepts as set forth herein.

The tube-carrier logistics service system simultaneously and seamlessly provides both storing and transport functions. This in contrast to prior art, where different devices and systems are used for these two functions. Carriers are operated in real time both for moving to any location (within a limit, in tube-carrier system and in external system it is fully integrated with) and at any speed (within a limit) and also into a storage state. The storage state function is achieved by operating the carrier at zero speed while the operation of the onboard sensing and communication unit continues.

In a first aspect, a logistics service system comprises at least one tube connecting at least one terminal, at least one carrier configured to hold goods to be handled in the logistics service system, at least one switching device arranged to connect at least two of said tubes, and configured to redirect said carrier from one of said tubes into another of said tubes, at least one means for propulsion of the at least one carrier in said tube, and a control system comprising at least one control unit being configured so the system can produce logistics services that include both storing and transport functions.

In a second aspect, a method for providing logistics services by operating the tube-carrier based logistics service system is provided. The method comprises the steps of providing a goods item to the logistics service system; assigning service order information obtained from the control system to a carrier; inserting the goods item into the assigned carrier; and operating the logistics service system according to the assigned service order information.

In a third aspect, a storing and switching device for carriers of a logistics service system is provided. The storing device comprises a barrel provided with at least two through openings configured to house the carrier to be stored or switched, the barrel being configured to be rotatable around a center axis and the at least one through opening being configured to be possible to align with at least one tube of the logistics service system for storing functionality and with at least two tubes for switching functionality.

In a fourth aspect, a method for storing and switching carriers in a storing and switching device provided in a logistics service system is provided. The method comprising the steps of: rotating the barrel such that one of the at least two through openings is aligned with a first tube of the logistics service system; operating a carrier to be stored or switched through the first tube and into the through opening aligned with the first tube such that the carrier is housed within the through opening; rotating the barrel such that another of the at least two through openings is aligned with the first tube and, when the device is being operated for switching, the through opening housing the carrier is aligned with a second tube.

In a fifth aspect, a device for detecting, mitigating, and preventing leakage and opening of a carrier of a logistics service system comprising at least one gas proof barrier enclosing a second environment being different regarding at least one characteristics feature from the first environment surrounding said gas proof barrier, at least one detector provided within said gas proof barrier, registering at least one characteristics feature of the environment, the detector is provided with means to signal its measured data to an external communication unit, and said communication unit is arranged to analyze the data and take action.

In a sixth aspect, a method for detecting, mitigating, and preventing leakage and opening of a carrier or goods item of a logistics service system comprising the steps of: providing at least one gas proof barrier in association with the enclosure; producing a second environment within said gas proof barrier; said second environment is different regarding at least one characteristic feature from the first environment surrounding said gas proof barrier; arranging at least one detector within said gas proof barrier for registering data regarding at least one characteristic feature of said second environment; supplying the said data from the detector to an external communication unit; analyzing said data; taking action based on said analyzes.

BRIEF DESCRIPTION OF THE DRAWINGS

In order to best describe the manner in which the above described embodiments are implemented, as well as define other advantages and features of the disclosure, a more particular description is provided below and is illustrated in the appended drawings. Understanding that these drawings depict only examples of embodiments of the invention and are not therefore to be considered as limiting in scope. The examples will be described and explained with additional specificity and detail through the use of the accompanying drawings in which:

FIG. 3b is a schematic view of a switch at a junction between three tubes in the logistics service system;

FIG. 3c is a schematic top view of a turning device of the logistics service system;

FIG. 3d is a schematic side view of the turning device of FIG. 3c;

FIG. 11b is a schematic top view of the operation of the device in FIG. 11a

DETAILED DESCRIPTION

Figure 1:
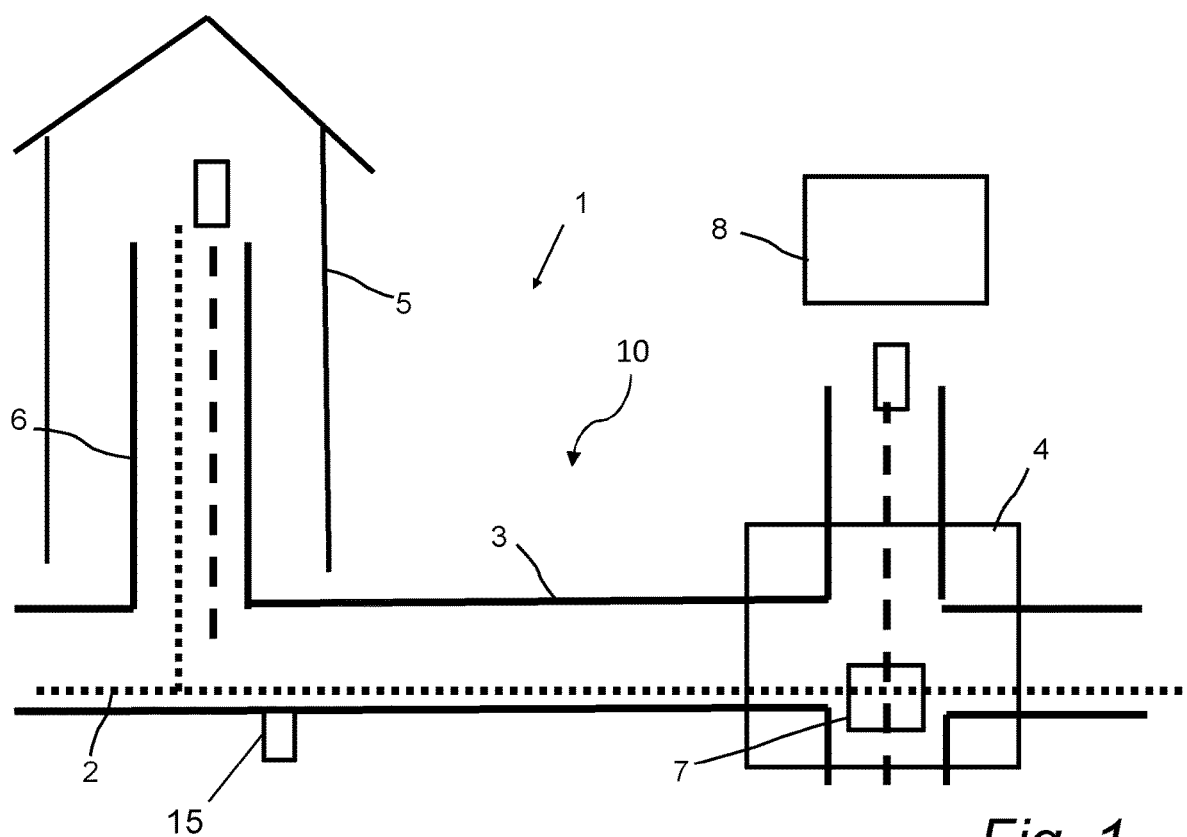
FIG. 1 is a schematic view of a logistics service system in a city district

Hereinafter, certain embodiments will be described more fully with reference to the accompanying drawings. It will be apparent to those skilled in the art that various modifications and variations can be made without departing from the inventive concept. Other embodiments will be apparent to those skilled in the art from consideration of the specification and practice disclosed herein. The embodiments herein are provided by way of example so that this disclosure will be thorough and complete, and will fully convey the scope of the inventive concept, and that the claims be construed as encompassing all equivalents of the present inventive concept which are apparent to those skilled in the art to which the inventive concept pertains. If nothing else is stated, different embodiments may be combined with each other.

Various embodiments of the disclosed methods and arrangements are discussed in detail below. While specific implementations are discussed, it should be understood that this is done for illustrative purposes only. A person skilled in the relevant art will recognize that other components, configurations, and steps may be used without parting from the spirit and scope of the disclosure.

In the description and claims the word "comprise" and variations of the word, such as "comprising" and "comprises", does not exclude other elements or steps.
The Logistics Service System, its Parts, and External Connections Referring to FIGS. 1-3, a logistics service system 10 is shown. The logistics service system is a tube-carrier system 10. The logistics service system 10 is arranged to store and transport goods to and from locations, e.g. in and around a city, through tubes 14, 16. Some tubes may be referred to as main tubes 14, and some tube may be referred to as branch tubes 16. The logistics service system 10 is arranged to transport goods e.g. to and from a user terminal in the courtyard adjacent to residential buildings, the entrance of apartment buildings, apartments, stores, shops, warehouses, service establishments, and other commercial or municipal facilities. The goods may e.g. be groceries or retail goods which a person has ordered or bought for delivery, laundry to be cleaned, or personal items to be stored in the system. In use cases with commercial or municipal organization other goods items will be handled by the system. The system 10 is also arranged for storing carriers, provided with goods or empty, for short or long term, anywhere in the system. Furthermore, it is arranged for transporting goods out from the user terminals. For example, return of goods to e-retailer, transport of hot meals from restaurants and removal of trash and solid, wet and liquid waste from both households and commercial and municipal facilities, preferably by keeping them separated in different fractions all the way.

The logistics service system 10 is configured to enable keeping the goods moving at all the times, thus not only transporting items from a point A to a point B. It is in many situations energy efficient to keep the goods within the system 10 in motion.

The logistics service system 10 allows for pre-positioning of items/products/goods in locations where they are expected to be in demand. Certain items/products/goods may thus be transported to certain, predetermined areas where a demand for that specific item/product/goods is expected to occur. The items/products/goods circulate in the system 10, but within the predetermined area until a user (person, store/shop, office, etc.) demands/orders/requests that item. The customer is offered more flexibility and delivery time is expected to be shorter compared to prior art.

Two types of users are defined in relation to the system 10, a first user taking part in the operation of the system. This user may be a shop/store, facility, or a service personnel. The second type of user is a receiver of the service of the system. This may be a customer who places an order from a store as described in FIG. 8b, or a person sending or placing items in the system for delivery or for later retrieval as described in FIG. 8a.

The logistics service system 10 may be arranged partly or completely underground or partly or completely above ground. Preferably, the tubes 14, 16 are colocated with other utility pipes and cables 2, e.g. water, sewage, district heating, electricity, phone and fiber optic cable, in a common outer enclosure, preferably a horizontal culvert 3 or vertical shaft 6 in buildings 5, and where propulsion means 15, storage devices 30, and switching devices 51 preferably are co-located with other utility devices 7, e.g., valves, joints, pumps, heat exchangers, switches, and distribution boards, in a common outer enclosure, i.e. hubs 4. This is illustrated in FIG. 1

In some embodiments it is preferable to use the tubes to transport both carriers and air for heating or cooling the interior of buildings. The air is transported one way in the tube and the other way in e.g. the cavity of the enclosure of the tube, a culvert 3 or vertical shaft 6. This embodiment of the disclosed invention will replace water-based radiators and local air conditioners. Related devices such as heat pumps and heat exchangers between district water-based heating and air to be transported in the tubes are preferably located in the multi-purpose hubs 4. In case of fire, the tubes leading to the interior of buildings could preferably be used to transport gas for fire extinction, e.g. halon or carbon dioxide.

Figure 2:
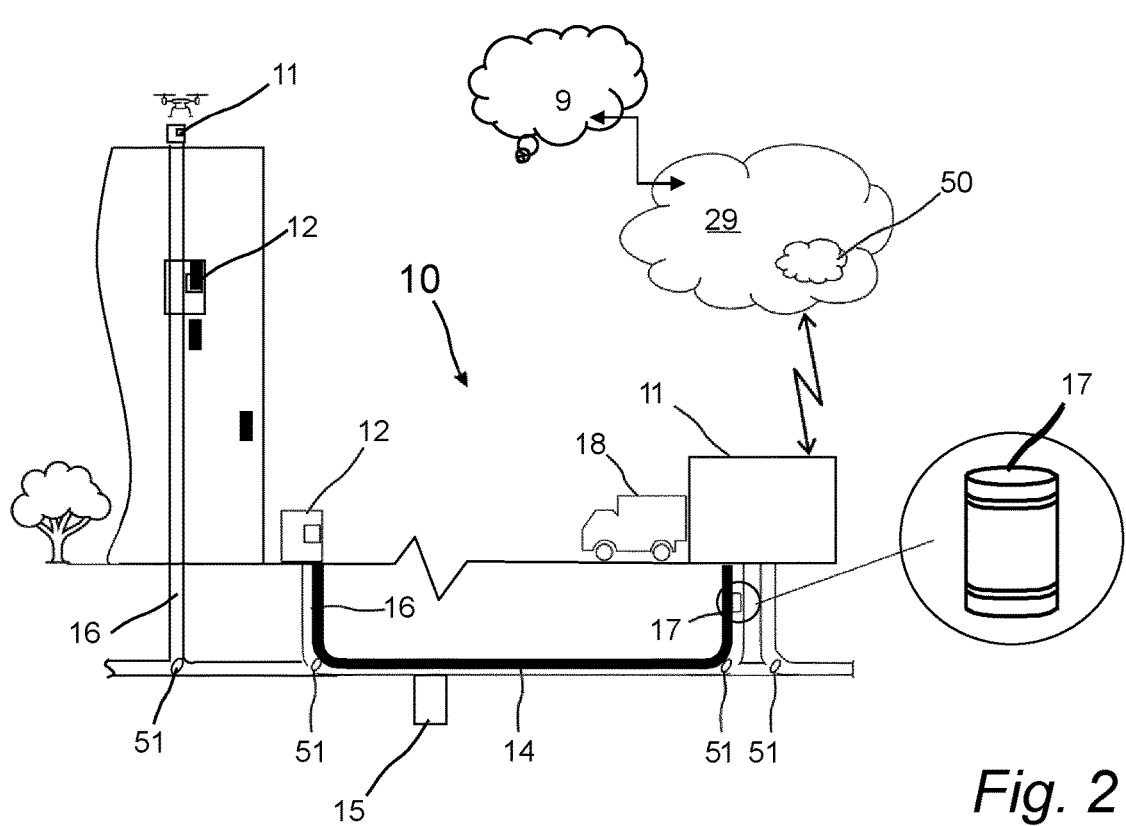
FIG. 2 is a schematic side view of the logistics service system in FIG. 1.
Figure 3:
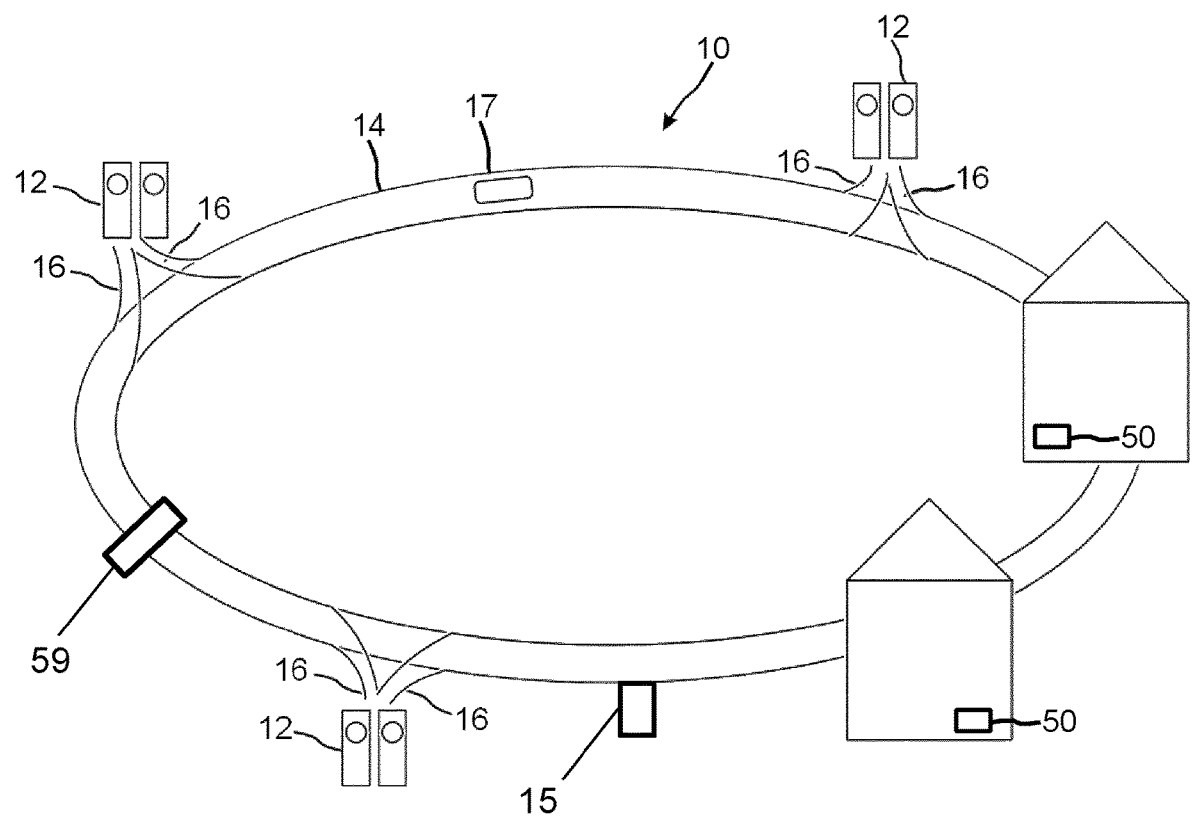
FIG. 3 is a schematic view of the logistics service system of FIGS. 1 and 2.

Within cities, gases for energy production such as biogas, natural gas or hydrogen need to be transported. In some embodiments of the invention this could preferable be done in the main tubes 14 between the hubs 4. In a similar way fresh water, sewage water, irrigation water, storm water, district heating water can in some situations be preferable to transport in the branch tubes 16. E.g. both the culverts 3 and the tubes 14 are arranged to also transport storm waters in emergency situations. This is illustrated in FIGS. 1-3.

In various embodiments, the logistics service system 10 comprises at least one main tube 14, at least two terminals, at least one propulsion means 15, at least one branch tube 16 configured to connect the main tube 14 with the terminals, and at least one carrier 17 configured to carry goods 48 to be transported in the logistics service system 10. The terminals may be transfer terminals 11 and/or user terminals 12 in any combination and in any number. The propulsion means 15 are physical locations holding equipment and power source for moving the carriers 17 within the tubes 14, 16. The equipment for moving the carriers 17 include e.g. fans/blowers if moved by gases including air, pumps if moved by liquids, drive wheels provided on the inside of the tubes 14, 16 and/or on the carrier 17, and electromagnets. The carrier 17 may comprise propulsion means and/or auxiliar propulsion means.

In various embodiments, the logistics service system 10 further comprises a control system where all subsystems and components such as access devices, sensing and communication units, a central control unit, and control units in other devices communicate with each other's as well as with a related external information system 9. It is configured to individually steer the carrier in time and space by keeping track of and controlling the carriers 17, e.g., their location, destination, route, and speed, where zero speed means storing of the carrier 17. The routing of the carrier may be controlled by operating switching devices 51, the speed may be controlled by operating the means for propulsion 15, e.g. fans, blowers, pumps, electromagnets or wheels on the inside of the tube or on the carriers.

Figure 3A:
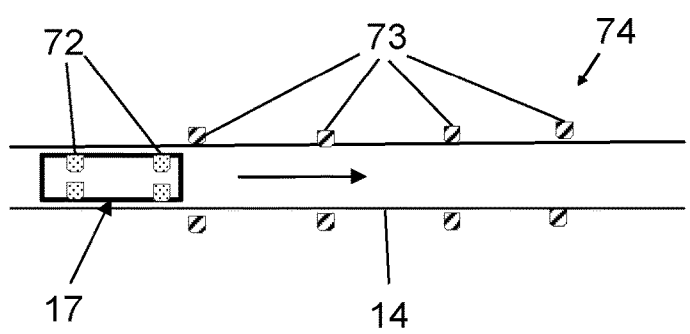
FIG. 3a is a schematic view of an acceleration arrangement in the logistics service system.

In various embodiments, the logistics service system 10 further comprises an arrangement 74 for acceleration and deacceleration (positive and negative acceleration), also referred herein to as speed control arrangement 74, of the carriers 17, see e.g. FIG. 3a. The arrangement 74 comprises several electromagnets 73 arranged on the tubes 14, 16 at locations where carriers need to slow down; stop; be hold fixed in place; or accelerate, and at least one permanent magnet 72 arranged on the carrier 17. The electromagnets 73 may be arranged along the entire extension of the tubes 14, 16, or they may be arranged along certain stretches of the tubes 14, 16 for propulsion of the carriers.

The permanent magnets 72 may be arranged in a circular or ring-shaped manner around the circumference of the carrier 17, or in two or more separate ring shapes distributed along the longitudinal extension of the carrier 17.

When the carrier 17 has been set in motion by the propulsion means, the speed control arrangement 74, the permanent magnets 72 of the carrier 17 interact with the electromagnets 73. The electromagnets 73 are controlled by the control system to steer the carrier 17 to its destination. By means of the electromagnets 73, the carrier 17 is controlled to rotate, accelerate, decelerate, stop, change direction, or maintain a predetermined speed. The acceleration arrangement 74 may be used with any propulsion means 15, e.g., the ones mentioned above.

The speed control arrangement 74 may alternatively be used as a primary source of propulsion. In this case means such as air pressure difference, drive wheels provided on the carrier 17 or on the inside of the tubes 14, 16 may be used as a second or back-up means for acceleration/deceleration, stopping, changing direction, or maintaining a predetermined speed of the carrier 17.

The speed control arrangement 74 is beneficial in that it comprises no mechanical parts such as pipes or valves for air or other gases. It is also not necessary to make holes or openings in the pipes 14, 16, as the magnets may be provided on the outside of the pipes 14, 16. The components of the acceleration arrangement 74 are also of low cost, both for original supply/provision of the components, and for maintenance of the installed arrangement 74. It is a reliable arrangement which is not prone to failures, partly due to the absence of moving parts. The speed control system 74 is compact and it can be arranged to control the speed, acceleration, deceleration, and position of the carrier 17 with very high precision. Furthermore, there is no need to slow down the carriers 17 in e.g., tube junctions where several tubes interconnect. The electromagnets 73 can also be used to measure the exact position and speed of carriers which is important feed-back to the control system.

In alternative embodiments, possibly combined with the electromagnetic guidance described above, the guidance of the carrier may be performed by means of air ejected through nozzles. In alternative embodiments, possibly combined with the electromagnetic guidance and/or the air nozzles described above, the guidance of the carrier may be performed by means of mechanical arms. These options are possible both along the tubes and in relation to switching devices, which are described below.

Switching

In FIG. 3b, a first type 75 of switching device 51 using electromagnets is shown. When the carrier 17 travels along the main tube 14, and approaches a junction comprising a first tube 14a and a second tube 14b, the control system is configured to activate the electromagnets 73 of e.g. the first tube 14a, into which the carrier 17 is destined in order to guide the carrier 17 along the intended path.

When the carrier 17 travels in the opposite direction, from one of the first 14a and second 14b tubes towards the tube 14, the electromagnets 73 are controlled to guide the carrier 17 into the tube 14.

If two carriers 17 simultaneously approach the switching device 75, or junction, one in the first 14a, and one in the second 14b tube, the control system is configured to operate the electromagnets 73 along e.g. the first tube 14a in order to slow down the carrier 17 located in that tube 14a. After the carrier 17 located in the second tube 14b has passed the junction with the switching device 75 into tube 14, the control system is configured to operate the electromagnets 73 to guide the carrier 17 located in the second tube 14b into the tube 14.

In alternative embodiments, the electromagnetic switching devices are linked together in a series, where one tube 14a branches into several tubes 14b-14x. This arrangement can be used for transport of carriers between any two terminals in the system 10. The carrier is moved from the sending terminal in tube, e.g., 14e, to the switching arrangement and arrive at tube 14a where it stops and is moved in the other direction through the switching arrangement and leaves in tube, e.g. in tube 14g that leads to the receiving terminal. This arrangement can replace mechanical and bulky switching devises used in current praxis. It can be arranged in one plane or in two dimensions connecting tubes 14b-14x that are arranged in a bundle, e.g. for connecting the bundle of detachable storage tubes 81 when it is loaded or unloaded from/to a single tube instead of from/to the bundle of tubes 43 as described in FIG. 6b.

In FIGS. 3c and 3d, a second type of switching device 71 is shown. This switching device 71 comprises a turning device 71 comprising at least a first plate 76a. The turning device 71 may also comprise a second plate 76b, arranged with space in-between to keep it apart from and above the first plate 76a, when the plates are arranged in a horizontal arrangement. Several electromagnets 73 are embedded into the plates 76a, 76b, or are provided on a backside of the plates 76a, 76b. The backsides of the plates 76a, 76b of FIG. 3d are the sides not facing each other.

The turning device 71 is adjustable either to turn the carrier 180 degrees around and return it in the tube it came from, to replace a bend in the tube in confined spaces, or to serve as a switching device in a junction of several tubes 14, 14a, 14b. When a carrier 17 approaches the junction, the control system is configured to slow down the speed of the carrier 17, by means of interaction between the permanent magnets 72 arranged on the carrier 17 and the electromagnets 73 arranged along the tube 14. The control system is configured to bring the carrier 17 to a stop at the turning device 71 such that the carrier 17 is located above the first plate 76a, or, between the plates 76a, 76b. Thereafter, the control system is configured to control the electromagnets of the plate(s) 76a, 76b to interact with the permanent magnets 72 of the carrier 17 such that the carrier 17 is rotated to be aligned with the tube 14b through which it is determined to travel. When the carrier 17 has assumed its position, the control system is configured to operate the propulsion means 15 to accelerate the carrier 17 into the tube 14b.

Alternatively, the turning device 71 comprises a mechanical turning plate, which is arranged to rotate around a vertical axis. In order to align a carrier 17 located on the turning plate with a tube, the plate is rotated such that a predetermined orientation of the carrier is obtained.

Figure 3E:
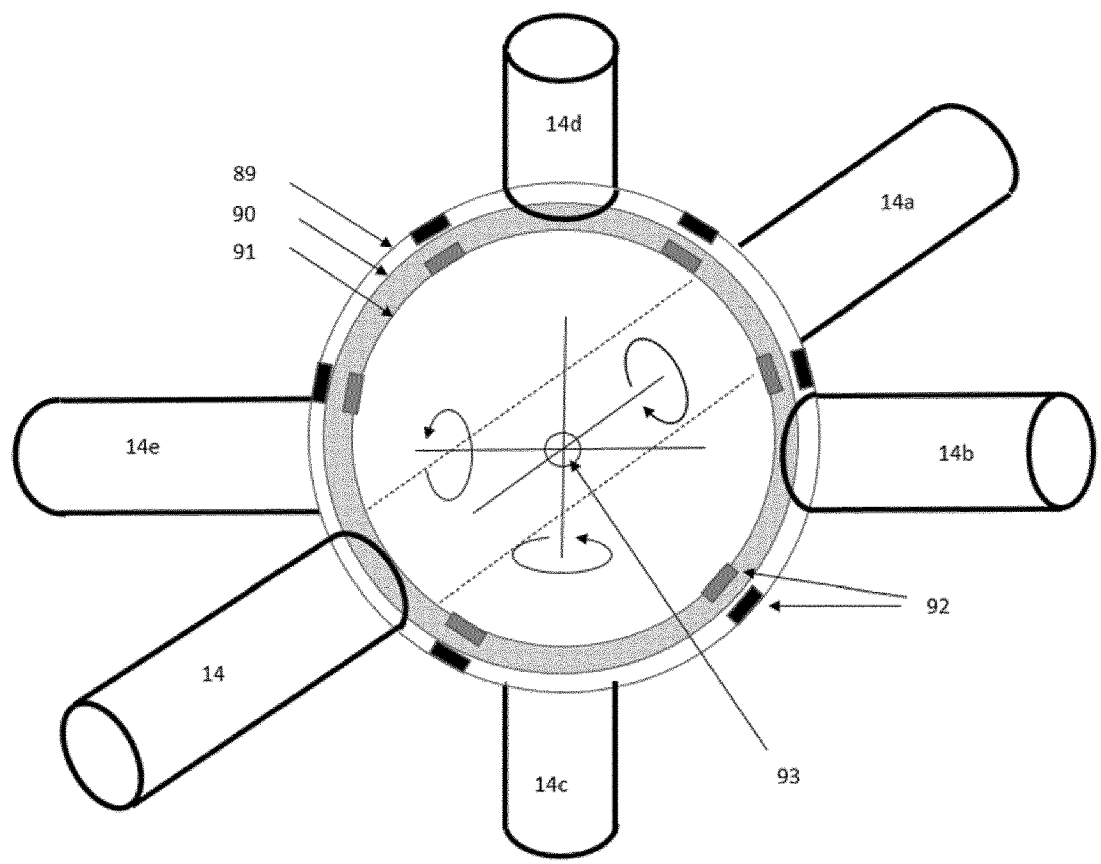
FIG. 3e is a schematic top view of a spheric turning device of the logistics service system.
Figure 3F:
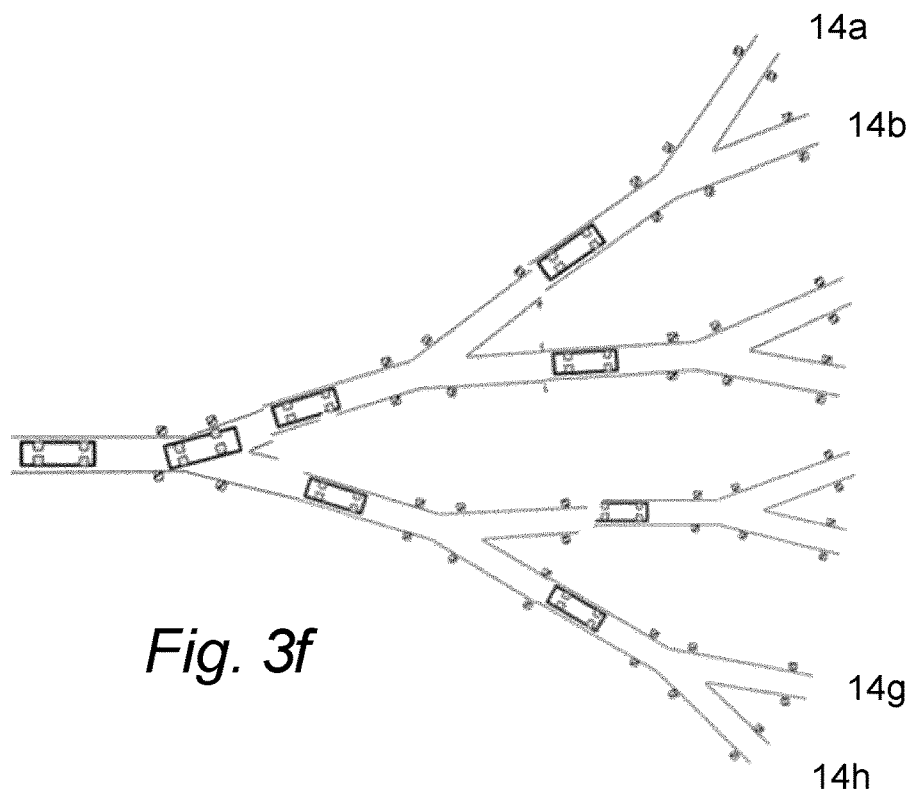
FIG. 3f is a schematic side view of an array of the switches in FIG. 3b

In various embodiments, the turning is a performed in a sphere in three dimensions as shown in FIG. 3e, referred to as a Turn-sphere. The advantage over the two dimension turning devices in FIGS. 3c and 3d is that the connecting tubes can be arranges in any direction not only in one plane.

The Turn-sphere in FIG. 3e is a gear device for three-way directed conveyance (X, Y, Z,) consisting of an outer 89, middle 90, and an inner 91 sphere with possible rotation in three directions. The device contains a multi-bearing middle 92 and inner 93 magnetically controlled gear device which steers in- and outgoing capsule in any X, Y, Z direction. It consists of an outer sphere 89 and two individually rotatable magnetic controlled inner spheres 90, 91. The two inner spheres 90, 91 are controlled by an internal magnetic control device.

In the shown embodiment there are six inlet-outlet tubes placed on the spheres top and bottom, on front and rear side, and on left and right side. All tubes will pass through the centre of the turn-sphere. When a capsule arrives to the Turn-sphere from any direction it will be stopped in the centre of the sphere. The middle and the inner sphere will position itself assisted by the internal magnetic control device 92, depending on the information associated with the capsule and where the end goal is, will the magnetically controlled middle and inner sphere be positioned in the correct position and releases the capsule into the system for the next transport leg in any of the tubes 14-14e.

Terminals

The transfer terminals 11 are physical locations where carriers 17 can be provided with goods and loaded into the system 10. Conversely, carriers 17 may be unloaded from the system 10 at the transfer terminal 11. The transfer terminals 11 are connected to other modes of transport, e.g. a road, rail, harbor, airport, or drone-port infrastructure. At the transfer terminal 11, trucks, vans, cars, or other suitable type of vehicle 18 can park or dock, and objects/goods from these vehicles can be loaded into the system 10. Oppositely, goods/objects/items can be unloaded from the system 10 and onto the vehicles 18 for further transport. The transfer terminal 11 comprises at least one branch tube 16 connected to the main tube 14 of the logistics service system 10, each branch tube 16 comprising an opening which is closable by means of a lid in one or both ends or on the side, providing access to the carriers 17 located in the branch tube 16. This is illustrated in FIGS. 1-3.

Figure 4A:
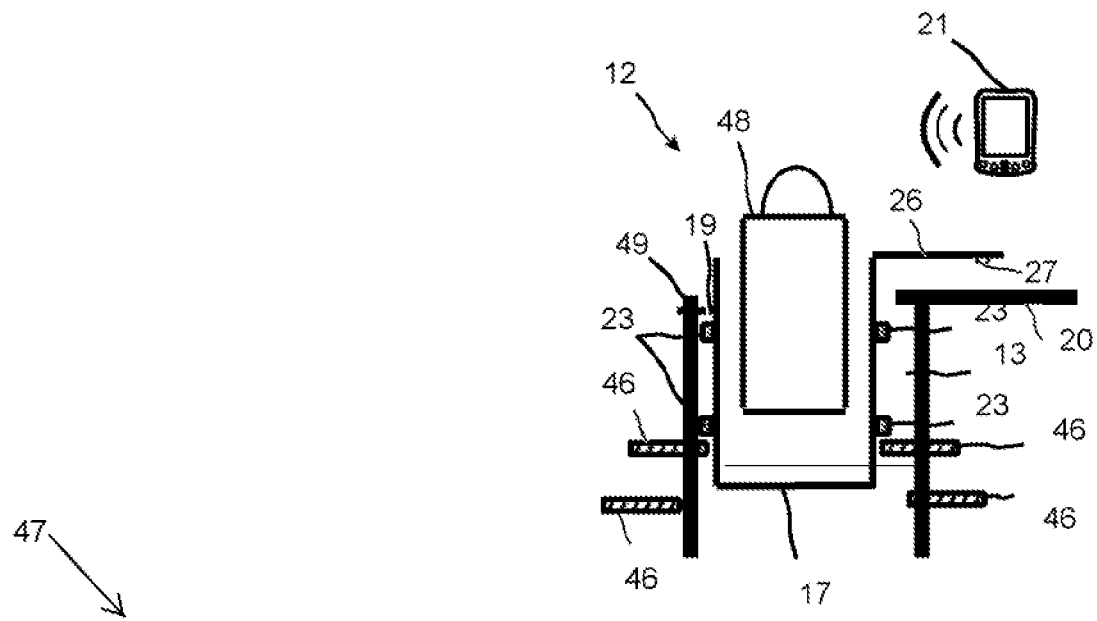
FIG. 4a is a schematic side view of a user terminal.

The user terminals 12, see FIG. 4a, are arranged for a user to send and receive objects, respectively. The user terminal 12 comprises a housing 13 connected to the main tube 14 via a branch tube 16. The housing 13 has an opening 19, and a door 20. The opening 19 is closable by means of the door 20. The door 20 is configured to be openable by a user by means of an access device 21. The access device is e.g. a key, RFID tag or a mobile device 21. The user terminal 12 further comprises a control unit, a memory unit and a communication unit. The user terminal 12 is configured to be arranged in a courtyard or a common house near residential buildings or in the lobby of an apartment building or inside stores, shops, warehouses, service establishments, and other commercial or municipal facilities. As a further option, the user terminal may be located outdoors, preferably in areas where people often pass by in order to be a convenient location for sending/collecting goods 48 from the system 10 or configured as a public waste basket.

The user terminal 12 further comprises two sets of holding devices, e.g. rods 46. The rods 46 are movably arranged between an extended position, in which they extend into the tube 16, and a retracted position in which they are not extending into the tube 16. The holding devices are arranged to support the carrier 17 when located in the user terminal 12. In order to let air in and out on the opposite side of the carrier where forces from over or under pressure moves the carrier, the user terminal 12 further comprises an air in- and outlet 57. The user terminal 12 further comprises a stop means 49. The stop means is e.g. arranged as a ring-shaped organ, shaped to allow a user to reach into the user terminal 12, but hindering the carrier 17 from being removed from the user station. The sealing rings of the carrier 17 are arranged to interact with the stop means 49 such that the carrier 17 cannot be removed from the user terminal 12.

The holding devices may alternatively comprise electromagnets 73 arranged in the user terminal 12. In this embodiment, the carrier 17 is provided with permanent magnets 72. The electromagnets 73 are configured to interact with the permanent magnets 72 in order to maintain the carrier 17 in the user terminal 12. This type of holding device is compatible with any propulsion method such as air pressure difference, electromagnetism, drive wheels provided on the carrier, drive wheels provided on the inside of the tube, etc.

The user terminal 12 may further be configured to communicate with an application of a mobile device 21 configured to interact with the control system of the logistics service system 10. The application may present certain predetermined choices for transport of the carriers 17 such that a user may quickly choose where the carrier 17 is to be transported. The corresponding features may additionally or alternatively be provided in an interactive display, e.g. a touch screen or any other suitable presentation and/or input means provided on or in relation to the user terminal 12.

Figure 4B:
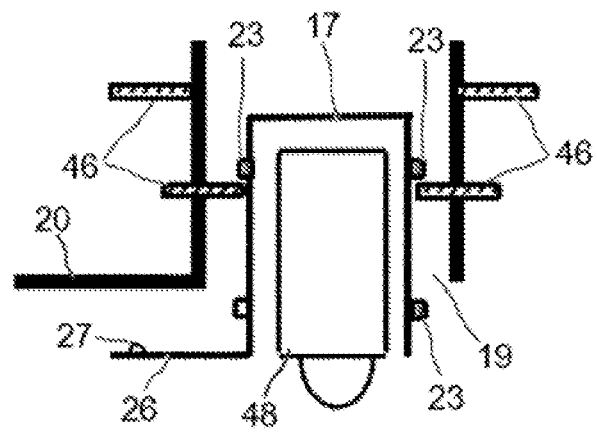
FIG. 4b is a schematic view of a device for automatic unloading at a terminal.
Figure 4C:
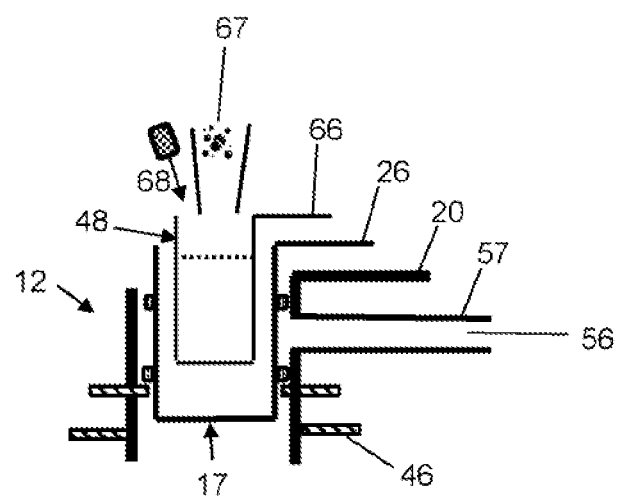
FIG. 4c is a schematic view of a device for loading wet and liquid goods.
Figure 5:
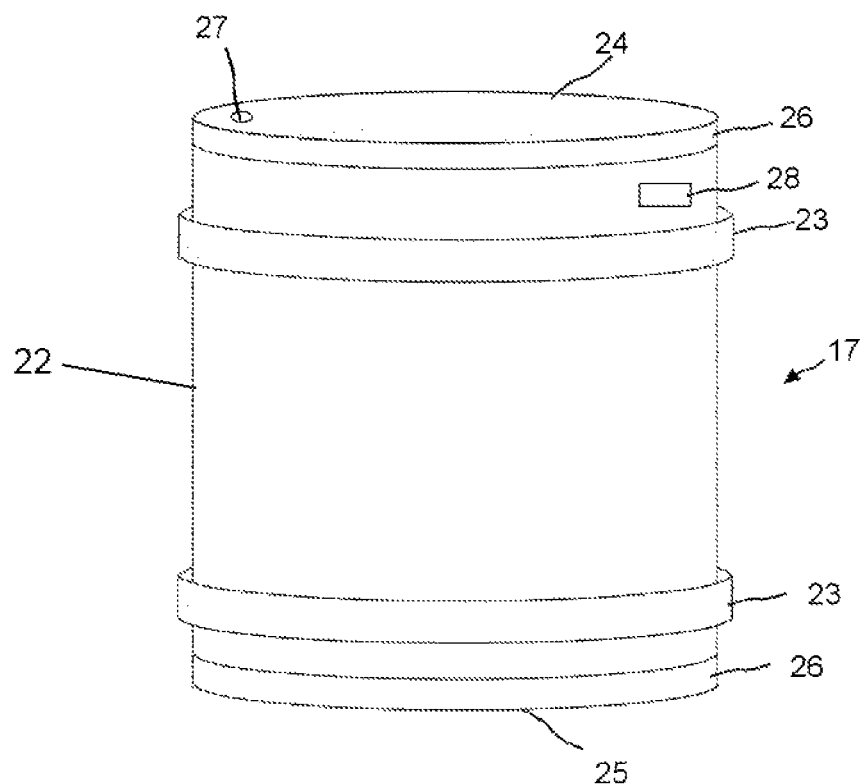
FIG. 5 is a schematic perspective view of a carrier.

The user terminal 12 in FIG. 4c is configured to automatically load wet or liquid waste from households, restaurants and commercial and municipal facilities, such as feces and urine from toilets, material from waste dispenser, and used frying oil. When the carrier 17 arrives at the user terminal 12 the door 20 of the terminal 12, the lid 26 of the carrier and a lid 66 of the goods item open automatically. The material 67, e.g. wet or liquid waste to be transported is dropped into the goods 48 designed as an inner container until a set fill level is reached. The fill level is measured with a sensor 68, e.g. sonar, radar or light sensor. Then all lids 66, 26 are closed and preferably both the goods 48 and the carrier 17 are vacuum sealed according to the method described in connection with FIG. 10.

Another design of user 12 or transfer 11 terminal is shown in FIG. 4b. This is an emptying device 47 configured for emptying carriers 17 by means of gravity. As the user terminal 12 in FIG. 4a, the emptying terminal 47 comprises two sets of holding devices, e.g. rods 46. The rods 46 are movably arranged between an extended position, in which they extend into the tube 16, and a retracted position in which they are not extending into the tube 16. When a carrier 17 enters the emptying terminal 47, one set of rods 46 are extended into their extended position, and the carrier 17 lands onto the extracted rods, the sealing ring 26 of the carrier 17 resting against the rods 46. The door 20 of the emptying terminal 47 is opened, the hatch 26 of the carrier 17 is opened, and the goods 48 inside the carrier 17 falls out by means of gravity.

The emptying device 47 is configured to be arranged above a collection means, e.g. a container, into which the items/goods 48 emptied from the carrier 17 may fall into. For example, the emptying terminal 47 may be used for trash which has been sorted into different fractions before placed in the carrier. A recycling central may be provided with emptying terminals 47 above every container for different fractions of waste, e.g. cardboard, glass, plastic etc. A user sends his/her plastic waste directly to the plastic container, where the carrier 17 is emptied automatically by means of gravity.

All terminals are provided with a control unit 50 comprising sensors, actuators, processor, memory, and communication means for communication with the carriers 17, with control units 50 of other components of the system, and with the central control unit.

Carriers

The carrier 17 comprises an outer housing 22, for example made of metal, plastic, composites, or any other suitable material. The carrier 17 is shaped as a cylinder with an outer diameter smaller than the inner diameter of the tubes 14, 16 in which it is intended to be transported. The carrier 17 is provided with sealing rings 23 around its envelope surface. The sealing rings 23 are arranged one in the vicinity of a first end surface 24 of the carrier 17, and one in the vicinity of an opposite end surface 25 of the carrier 17. The sealing rings are configured to seal against the inner surface of the tubes 14, 16. The media for propulsion within the tubes 14, 16 thus cannot pass the carrier 17. The sealing rings 23 are constructed not to add friction against the inner surface of the tubes 14, 16 and to serve as a support to the rods 46 and the stop means 49 that keep the carrier 17 in place. In such a case that the system does not use fluids as gas or liquid as means for propulsion of carriers, the rings only serve to keep the distance to the inner wall of the tube and support for said rods, e.g. the rings are clutches that only cover a smaller part of the peripheral surface. In one embodiment, fluids are transported through the tubes 14, 16, and at specific time slots, and also carriers 17 are transported through said tubes 14, 16.

The carrier 17 is further provided with a hatch 26. The hatch 26, e.g. in the form of a closable and openable lid is arranged in the first 24 and/or second 25 end surface of the carrier 17. The lid 26 is configured to be openable and closable by rotation of the lid 26 in a plane of the first 24 and/or second 25 end surface. In some embodiments, it is configured to be lockable in the closed state by means of a lock 27. The lock 27 is preferably an electric lock which is controllable by means of an electrical signal. The lock 27 may be controllable by means of an access device 21, which may be a tag or a mobile device. In an alternative embodiment the carrier is provided with a door on the side and the terminals are arranged to give access to the side door for loading and unloading of goods (not shown here).

The carrier 17 is further provided with a sensing and communication unit 28, comprising sensors, e.g. air pressure, different types of gases, temperature, light, position, and acceleration; processor; memory with several partitions, one or several communication means; and power source, e.g. battery or energy harvesting device. In one embodiment, the sensing and communication unit is a radio tag 28, but it may also be any other kind of suitable sensing and communication unit. The radio tag 28 is configured to transmit data from sensors and communicate data from the memory with at least one control unit 29, 50. In other embodiments the sensing and communication unit 28 comprises a display for visual communication or a device for communication with goods items inside the carrier, e.g. a reader for a NFtag, RFID-tag, QR code or bar code.

In another embodiment, the carrier contains a data memory as a goods item, e.g. for transporting and storing very sensitive information.

The user terminal 12 and the carrier 17 are in one embodiment configured so the carrier must remain in the user terminal 12 and in the tube 14, 16. It is configured to only be removed from the tube 14, 16 for e.g. service purposes, if it is defect and needs to be replaced by another carrier 17 or at a transfer terminal to be moved by another transport means to the transfer terminal of another tube system with the same or similar specifications for carriers. When the carrier 17 has been securely locked by the rods 46 in their lower position in a user terminal 12, it is configured to signal to the control unit of the user terminal that the door 20 of the user terminal 12 can be open with an access device 21, which may be a tag or a mobile device.

The same procedure is applicable to the transfer terminals 11. When the carrier 17 is in the user terminal 12, goods 48 may be inserted into, or removed from the carrier 17 by a user. When the carrier 17 is located in the transfer terminal 11, goods 48 may be arranged in, or removed from the carrier 17 either manually by an operator or automatically by means of a goods handling device (not shown).

In another embodiment the terminals are arranged so the carrier easily can be taken out of the system and be placed into the system. In this embodiment the carrier can be used as a load unit in other transport systems or for storages, as a secondary packaging for, e.g., returnable primary packaging, or as a primary packaging, e.g., for liquids or gas.

The carriers 17 are preferably multi-purpose carriers in which different kinds of goods may be transported. In embodiments where the carriers stay in the pipes, they have the same function as an elevator which also does not leave its shafts in contrast to pallets and containers that are removed from their conveyor system at terminals. However, a separate type of carriers is preferably used for waste and other goods that may emit gases or liquid that harm goods in other carriers or the tube system itself. These carriers are provided with an outer housing 22 and hatches 26 configured so they are gas tight, and they are operated with shorter intervals between cleaning at a service and maintenance terminal (not shown). For goods that is particularly vulnerable to antagonistic attacks, e.g. theft, exchange, alternation, sabotage, and deviation, special carriers are provided that detects unauthorized attempts to open them.

The carriers 17 may be provided with different kinds of inserts adapted for different types of goods. Fragile goods may need one type of insert and smaller items another. For goods needing to be kept at a specific temperature, cold plates may be added, e.g. containing a salt that shifts phase from solid to liquid at the desired temperature. For goods needing a specific atmosphere, the insert may consist of a gas tight bag surrounding the goods and the inner cavity is provided with the required gas mix and in some cases also with a device that absorbs or generates a particular gas, e.g. oxygen or water scavengers. Alternatively, or as a complement, part of the tube system is provided with temperature controlling devices, e.g. to complement or replace freezers and refrigerators in shops and households.

Usage of the Logistics Service System

Figure 8A:
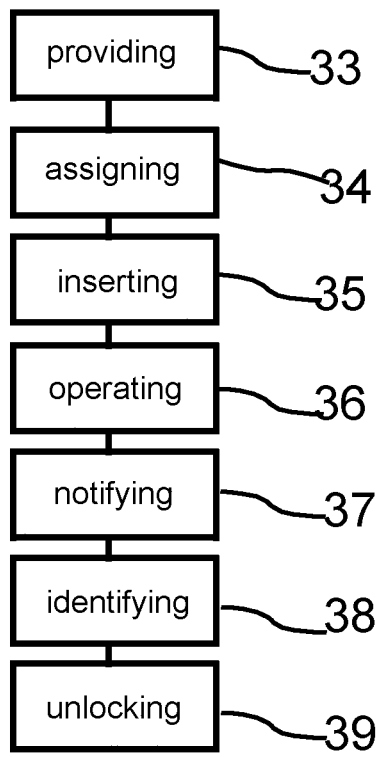
FIG. 8a is a flowchart of a method for distributing goods by the logistics service system in FIG. 1.

Referring to FIG. 8a, an example of the system 10 in use will now be described. A user living in an apartment connected to the logistics service system 10 orders an item in a web shop. The item is packed in a package provided with delivery details of the user (i.e. the customer). The package is transported by other means, e.g. by means of a road vehicle, to a transfer terminal 11 where it is unloaded from the vehicle. Now the package enters the automatic transport system of the logistics service system 10. The package is provided 33 to the transfer terminal 11 and the delivery details in the control system is assigned 34 to a specific carrier 17 holding a unique ID nr preferably contained in its sensing and communication unit 28.

A sensor recognizes that a package is ready to be collected and the control system directs a carrier 17 to enter the branch tube 16 of the transfer terminal 11 to which the package is assigned. The door of the branch tube and the transfer terminal 20 is opened when the carrier 17 is located in front of it, and the hatch 26 of the carrier 17 is opened. The package is automatically or manually inserted 35 into the carrier 17. Both the hatch 26 and the door of the branch tube in the transfer terminal is closed, and preferably locked. The control system assigns the previously retrieved delivery information to the carrier 17 and the carrier 17 is operated 36 through the tubes 14, 16 to the specified location ready to be collected by the user (customer).

If the customer has chosen the option to decide at a later time when and where to pick up the delivery, i.e. delivery is specified to be on-demand, the package is not directly transported to a user terminal 12, but is temporally put on hold somewhere in the system. The location for waiting is assigned based on several factors, e.g. where in the system expected future demand for moving and holding carriers will occur, and the most probable user terminal for shipment pick-up for the specific person and situation. The location for holding the carrier is in most cases not fixed and will change according to changes of the said factors. When the carrier 17 is put on hold, the control system is configured to notify 37 the user, e.g. by means of a notification to the mobile device 21 of the user. When the user identifies him-/herself at the user terminal 12, the carrier with the package is moved from its holding position to the user terminal 12. This method is favorable when the user terminal is not located in the house/apartment/establishment of the user, e.g. in a public area or in a common building. Alternatively, if the delivery time and place are specified beforehand, the carrier with the package remains in its holding position until just before the indicated delivery time when it is moved to the specified user terminal 12 to arrive just in time.

When arriving to the user terminal 12, the first set of holding means 46 are moved into their extended position such that they extend into the tube 16, see FIG. 4a. The sealing rings 23 of the carrier 17 supported by the extended holding means 46 such that the carrier 17 is kept in place in the user terminal 12 and prevent the carrier from being removed. For the user to retrieve the package from the logistics service system 10, he/she identifies 38 him-/herself in order to unlock 39 the door 20 of the tube and the hatch 26 of the carrier 17. The identification may be accomplished by means of a suitable tag, a biometric sensor or by communication via the mobile device 21. The control system identifies the user as the correct recipient by comparing the identification information with the delivery information. Then the user opens the door 20 of the user terminal 12 in order to access the carrier 17. The hatch 26 of the carrier 17 is now unlocked and the user may open it and retrieve his/her package. The hatch 26 is closed again and so is the door 20 of the user terminal. The carrier 17 may remain in the user terminal 12 for future transports, or it may be moved to a holding position anywhere in the logistics service system 10 or moved directly to another user terminal 12 or to a transfer terminal 11. When the carrier 17 is to be moved in the tube 10, 16 from the user terminal 12, the holding means are retracted into their retracted position, such that the carrier 17 can be moved.

If the user intends to return some of the received items in the package, e.g. to a retailer, the same procedure as described above is applied, but in the opposite order. The logistics service system 10 may also be used for e.g. transporting waste and trash from an apartment, office, commercial or municipal facility, or waste basket to a recycling center, for transportation of items between houses/apartments of individual users, for delivery of items to or from service providers as laundries, and local shops or restaurants. The user may also place his/her personal items for short or long term storing in the tube system to free up space in e.g. household storage units such as bookshelves, wardrobes, cabinets and even fridges and freezers, or in commercial and municipal facilities, such as offices, restaurants, hotels, plants, warehouses.

Figure 8B:
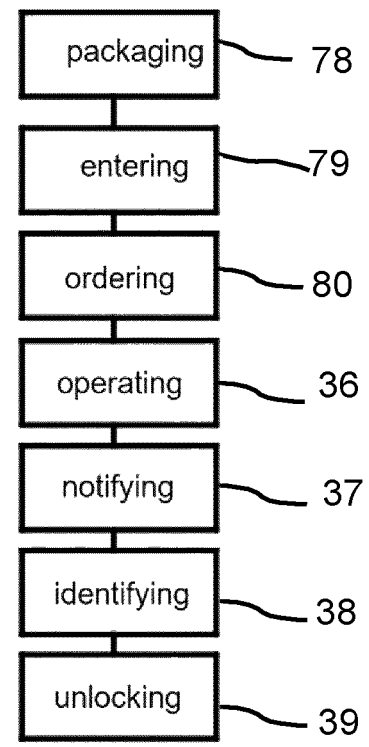
FIG. 8b is a flowchart of a method for order fulfilment by the logistics service system in FIG. 1.

FIG. 8b depicts an alternative use of the system 10. A goods producer wants to place one or several goods items 48 in the system 10 in speculation of future orders. S/He packs 78 them in one or several carriers 17, one item in each carrier, and transports the carriers 17 to a transfer terminal 11 where s/he enters 79 them into the system 10. The system 10 then moves the carriers 17 to a storage tube 43 at a place close to a location where the system has calculated that a potential customer probably will be located. Sometime later a customer 69 wants to buy one or several items and looks up on the Internet what is available in the system 10. S/He orders 80 one or several items and specifies delivery instruction. The system operates 36 the carrier(s) to a holding position near the location of the customer 69 with the goods item(s) 48 in the sequence the customer has decided. From there on the process continues as the one described in the example in FIG. 8a. In this use case, the logistics service system 10 functions as physical distribution center also referred to as order fulfillment center. The main advantages compared to prior art is that it is fully automated and hence there is no need for manpower; storing of items is performed in the tubes and hence there is no need for dedicated buildings and/or material handling equipment; goods is pre-positioned closer to the customer and hence much shorter delivery times are accomplished; the goods item(s) 48 is/are delivered to a place closer to the customer and hence less effort is needed on the part of the customer; and time and place for delivery are allowed to be changed at any time and hence more convenient for the customer.

The above example is one example only, of many possible use cases of the system 10. Other use cases may be transport of goods between stores/shops, between a storage facility and a store/shop, between a supplier and a recipient, two persons transporting an item between the first person's housing and the second person's housing, between a user and a recycling facility, or any other suitable use of the logistics service system.

Storing

The tube-carrier logistics service system simultaneously and seamlessly provides both storing and transport functions. This in contrast to prior art, where different devices and systems are used for these two functions. Carriers are operated in real time both for moving to or staying at any location in the tube-carrier system and in those external systems it is fully integrated with. The carrier can be operated at desired speed (within limits) and the function storing is achieved by operating the carrier at zero speed.

When the demand for holding or storing carriers becomes too large for the available capacity of the tube system, additional holding capacity can be obtained by adding tubes specially arranged for holding carriers for a longer time-period, i.e. a storing device. Such storage tubes may be formed as a straight piece of tubing where carriers 17 are inserted from one end portion and retrieved from the opposite end portion or inserted from one end portion and retrieved from the same end portion. They may be arranged horizontally or vertically. In the case of vertical arrangement, gravity may be used as a means for moving carriers. This type of storage device is favorable for storing empty carriers 17, or for storing pre-packed carriers 17 carrying the same type of goods, such that they are ready for quick delivery. Such storage tubes may comprise several straight pieces of tubing arranged in parallel. Each piece of tubing may be configured to store carriers 17 pre-packed with a certain piece of goods. Thus, several types of goods are ready for quick delivery, a form of automatic shops. This arrangement enables the establishment of local automatic shops for, e.g. groceries, consumables for offices, schools, nursing homes, and for replacement parts and tools. It also enables the replacement of storage spaces in local establishment and shops as well as private homes as describes above. The breadth and width of the assortment offered by said automatic storing and retrieval services can be further extended by arranging a transfer terminal for automatic loading and unloading of carriers with packages small enough to enable two or more to fit into the carrier. Preferably, these small packages are designed as modules that fit together in the carrier.

Figure 6A:
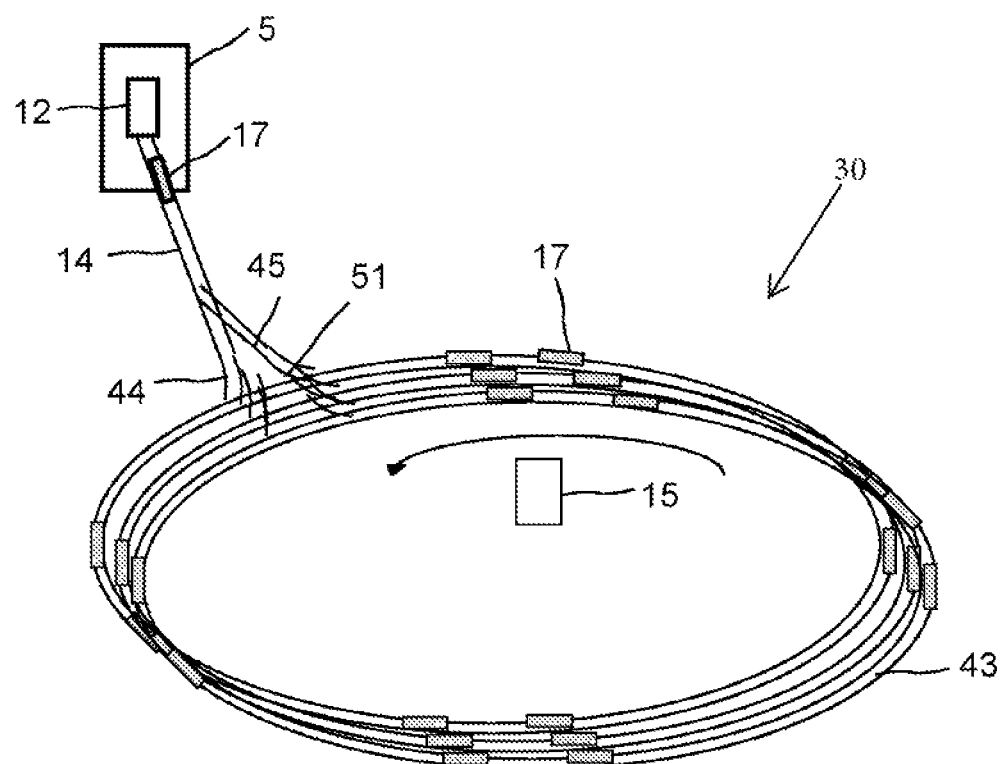
FIG. 6a is a schematic perspective view of a device for transport, storing, and retrieving carriers in the tubes according to one embodiment of the disclosed logistics service system.
Figure 6B:
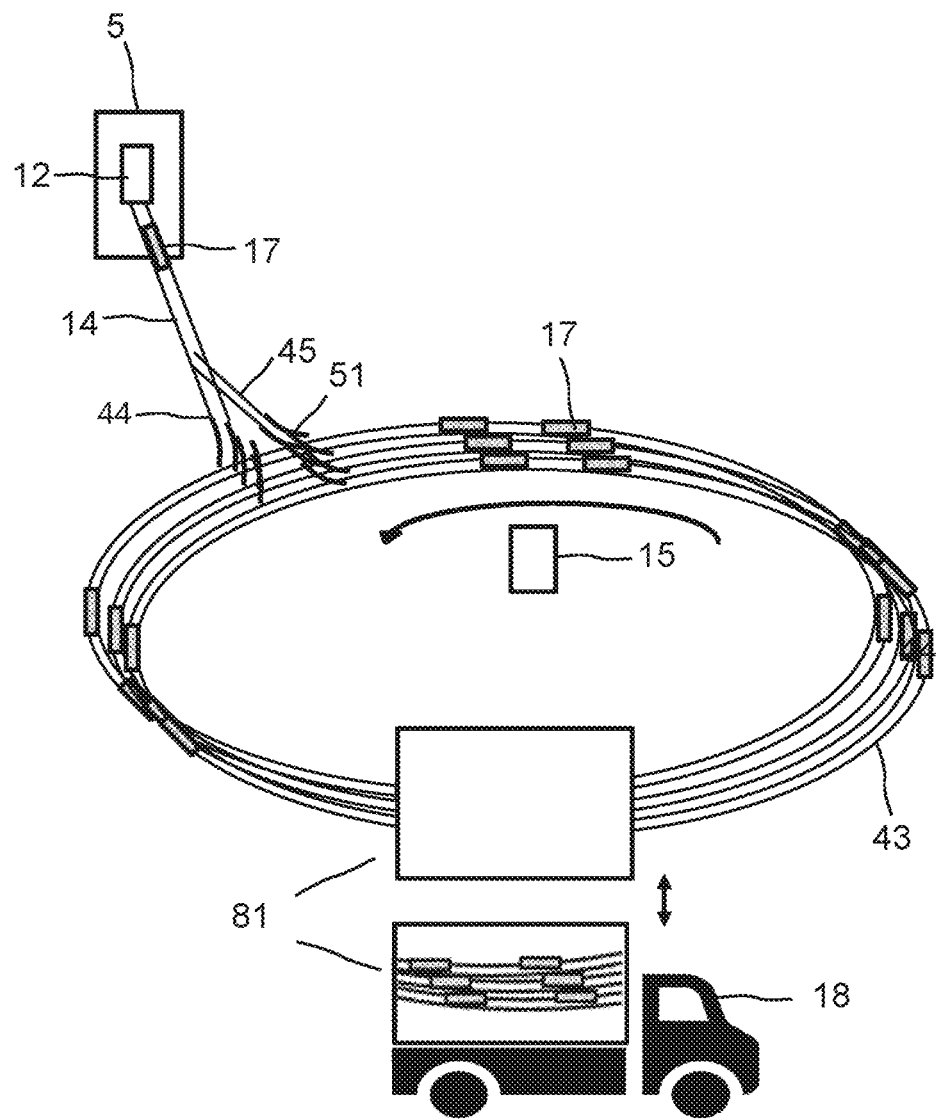
FIG. 6b is a schematic perspective view of a method to detach a section of the device for transport, storing, and transfer carriers in the tubes in FIG. 6a according to one embodiment.

The circular tube arrangement depicted in FIG. 6a is intended to be used for both moving and holding carriers as described above. In order to add holding and storing capacity to the tube system, one or several parallel tubes may be arranged by the side of the first tube. One of the tubes may be arranged primarily for transport, another for holding or storing a short time, and others for storing a longer time, as shown in FIG. 6a. It comprises a storage tube 43, an inlet tube 44 and an outlet tube 45. Carriers 17 are inserted from the transportation tube 14 via the inlet tube 44 into the storage tube 43. To retrieve a certain carrier 17, all carriers 17 stored in the storage tube 43 are moved until the specified carrier 17 is detected and retrieved from the storage device 30 via the outlet tube 45 and from there to a terminal 11, 12. Preferably, at least two parallel tubes are arranged so they may be used for both moving and holding/storing carriers. If one gets clogged, the other one takes over the first one's tasks. This reduces the vulnerability for disturbances. It is preferred to allow all carriers 17 arranged in the circular storage device 30 to circulate continuously, preferably at a relatively slow speed. Thereby, in the case pneumatic propulsion is used, it is not necessary to start the fans/blowers when a carrier 17 is to be retrieved from the storage device 30, and thereafter stop the fans/blowers. This saves energy and enables shorter time to retrieve goods items. In a complementary embodiment, one or several sections 81 of the bundle of the storage tubes 43 is arranged to be detachable and transferable, e.g. to an external transport or storage system 8, as illustrated in FIG. 6b. The outer housing of the detachable storage tubes 81 should preferably comply with standards for load units, e.g., EURO-pallet, ISO-container, Airplane-container, or a tube carrier with a larger diameter than the ones in the specified logistics service system.

Figure 6C:
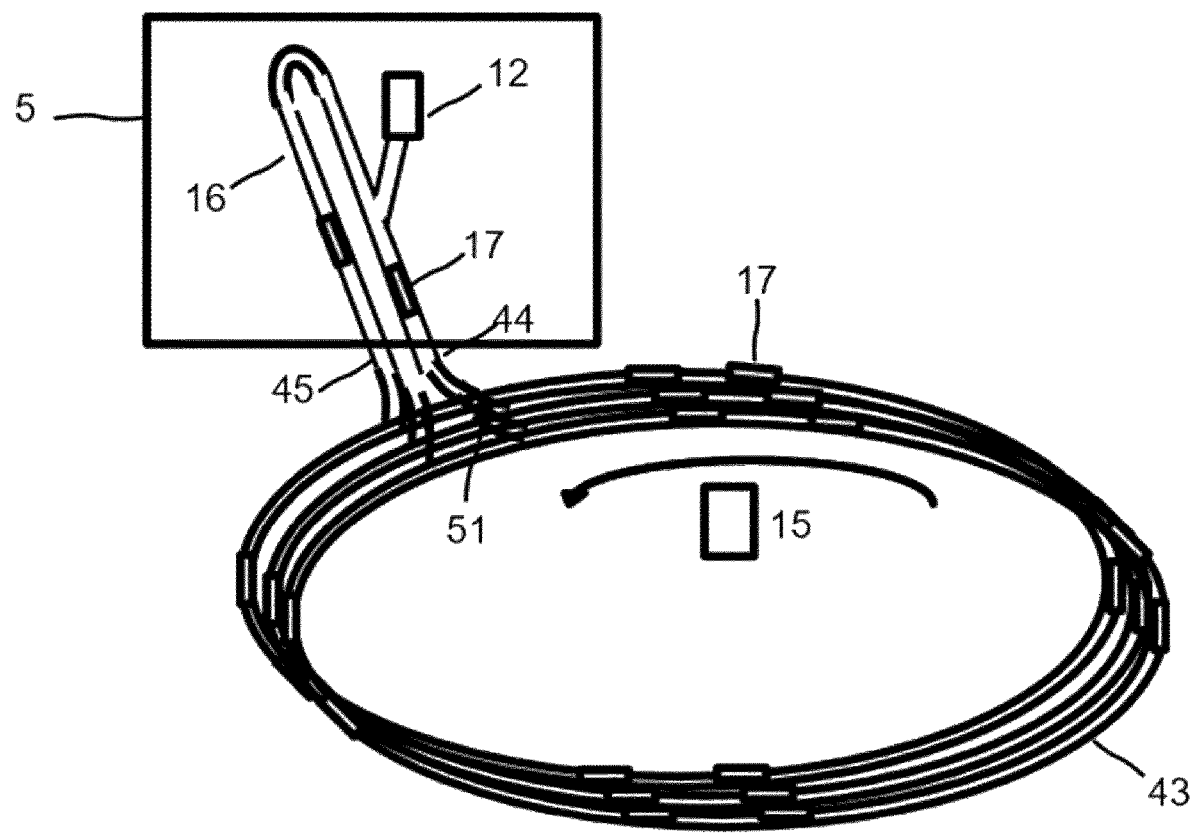
FIG. 6c is a schematic perspective view of a method for combining different propulsion means and concepts for carriers in FIG. 6a according to an alternative embodiment.

In another embodiment, where the fans run continuously to keep the carriers moving all the time, the route is expanded to also include one or several buildings as illustrated in FIG. 6c. This route change can be made, e.g., all the time, at regular time intervals, or on demand as is the case in most pneumatic waste removal installations.

In an alternative embodiment pneumatics, as in prior art, is used in one part, in the circular arranged tubes, and electromagnets, as shown in FIG. 3a, are used for propulsion in another part, e.g., within buildings. When electromagnets move the carriers, the air moves with them. Part of that air flow can be channeled to move the carriers in other parts of the system, e.g., within buildings. In that way the electromagnet propulsion does the same job as fans and air pumps, which then are not needed.

Figure 7:
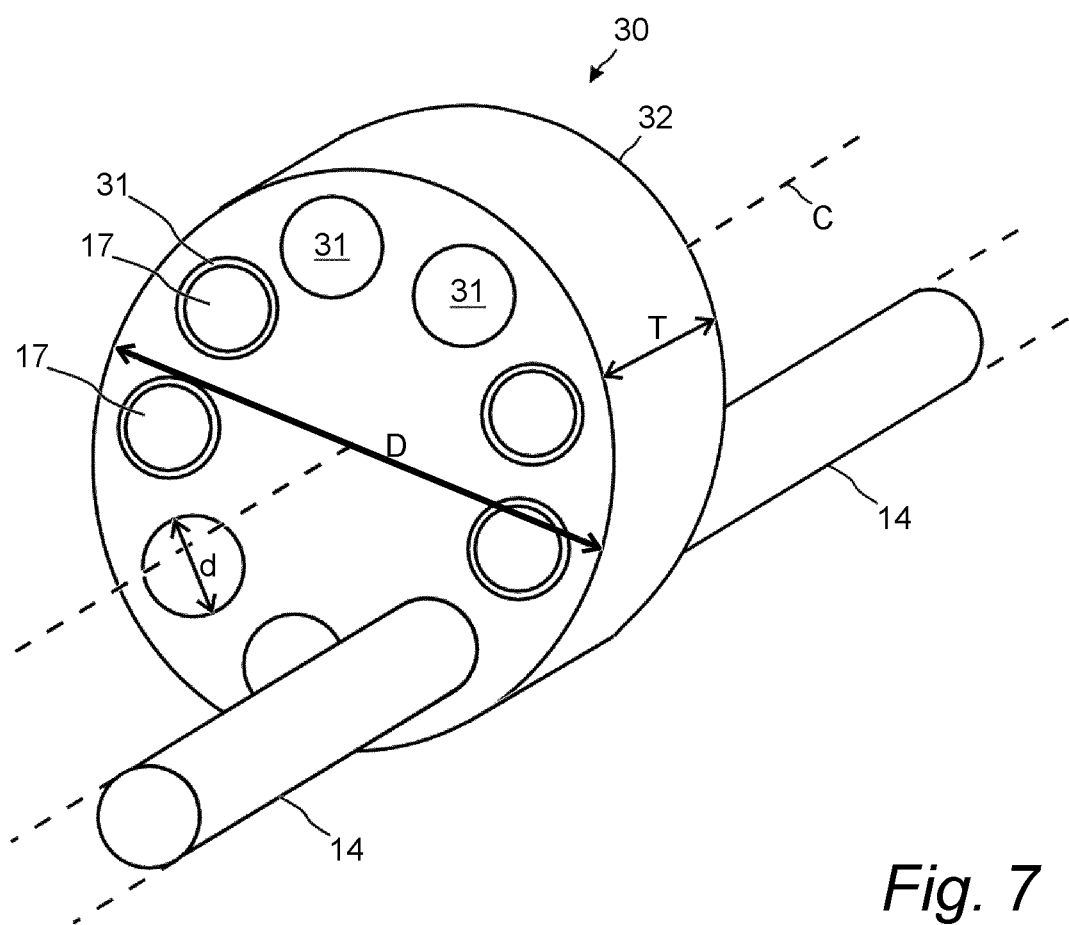
FIG. 7 is a schematic perspective view of a storage and switching device according to a further embodiment.

Another type of means to extend the holding capacity of the system is a rotating storage device 30, shown in FIG. 7. This storage terminal 30 is constructed as a disc or barrel 32 with a certain diameter D and a thickness/height T. The barrel 32 has a center axis C. Through openings, or through holes 31 with a diameter d are provided adjacent to one another in the vicinity of and along the circumference of the barrel 32. The openings 31 extend in the same direction as the center axis C. The diameter d of the through openings 31 is adapted to correspond to the diameters of the tubes 14, 16 of the system 10 in which the storage terminal 30 is to be arranged, and to the carriers 17. A carrier 17 is held in place with a means similar to those described in FIGS. 4a and b within a through opening 31, which thus functions as a holding and storage space. The storage device 30 is further provided with a motor (not shown) configured to rotate the barrel 32 around its center axis C. The motor is in operative communication with the control system of the logistics service system 10.

When arranged in the logistics service system 10, the storage device 30 is arranged such that one end of one through opening 31 is aligned with a section of tube 14. In the depicted embodiment, the tube is a main tube 14, but it could just as well be a branch tube 16. The other end of that through opening 31 is aligned with another section of tube 14, 16. The through opening 31 thus constitutes a piece of tubing in the system 10. By adding more tubes at either end of the barrel that are aligned with through openings, the device may function as a switching device where carriers only stay as long it takes to rotate the barrel. The device can simultaneously perform both switching and storing functions.

Figure 9:
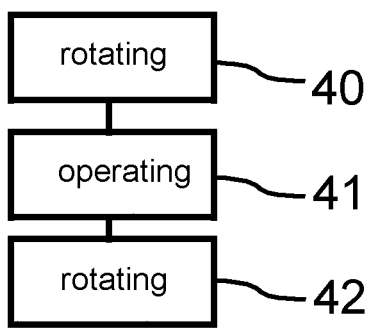
FIG. 9 is a flowchart of a method for operating the storage device in FIG. 7.

In use, referring to FIG. 9, when a carrier 17 requires to be stored or switched between tubes, the control system controls the storage device 30 to be rotated 40 around the axis C such that a free through opening 31 is aligned with the tube 14. The carrier 17 to be stored is controlled 41 into the through hole 31, and the storage device 30 is controlled to rotate 42 around axis C again such that the tube 14 is aligned with another, empty through hole 31. Thus, the carrier 17 is stored or switched, and other carriers 17 may pass the storage device 30 on their way through the logistics service system 10. The control system of the logistics service system 10 is configured to register which carrier 17 is stored in which through hole 31 in order to be able to retrieve the correct carrier 17 for further transport.

When a carrier 17 is to be retrieved from the storage device 30, the opposite procedure is applied, i.e. the control system actuates the motor to rotate the storage terminal 30 such that the through opening 31 containing the specified carrier 17 is aligned with the tube 14 or other tube on the side of the device, such that the carrier 17 is allowed to leave and move towards its destination according to the description above.

Figure 11A:
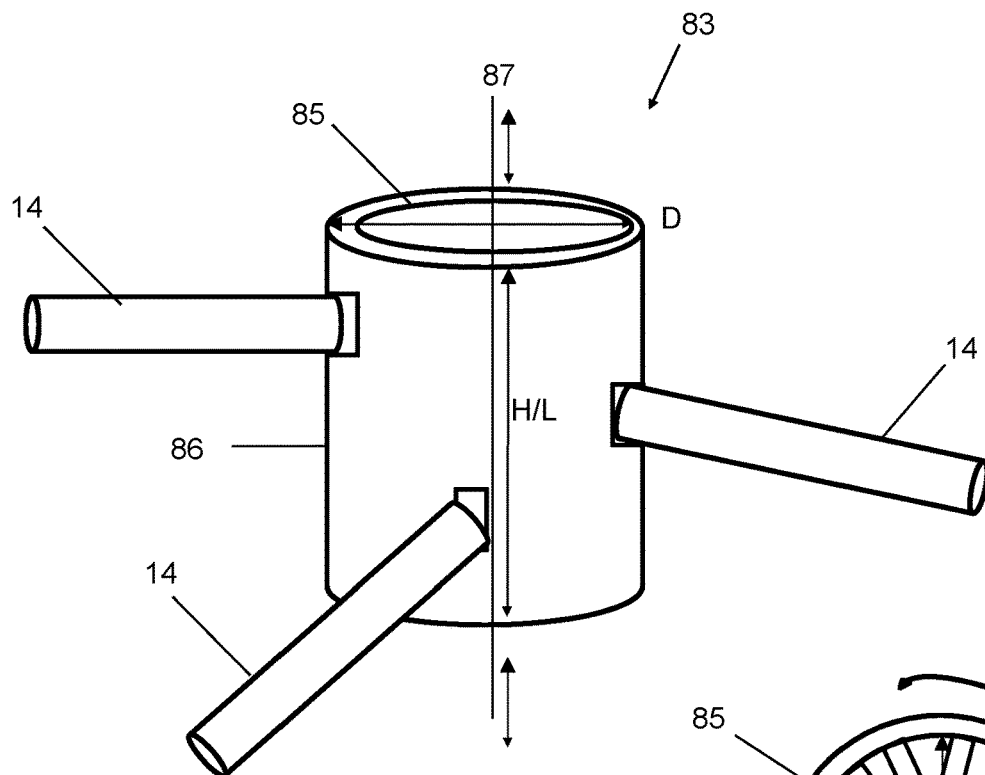
FIG. 11a is a schematic perspective view of a detachable storage, transfer, and switching device according to a further embodiment.
Figure 11B:
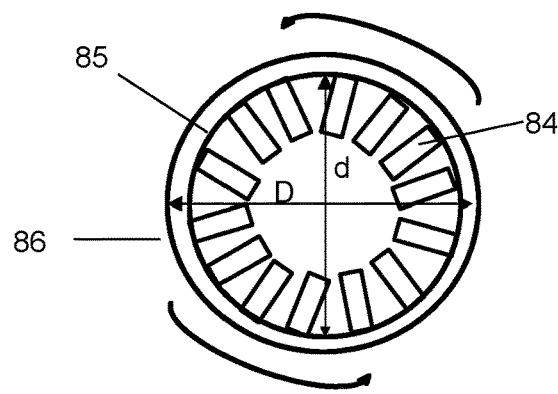
Figure 11C:
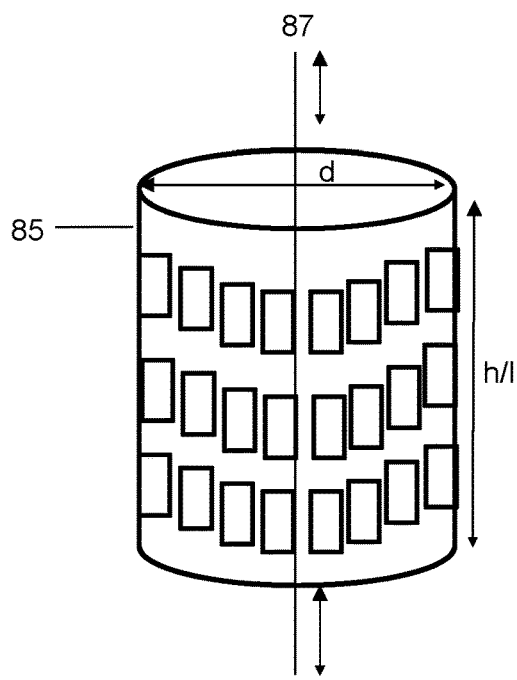
FIG. 11c is a schematic perspective view of a detachable inner barrel of the device in FIG. 11a Further, in the figures like reference characters designate like or corresponding parts throughout the several figures.

Another embodiment of a storage and switching device 83 is shown in FIG. 11a, preferably circular shape, consisting of one outer unit 86 that could be fixed, and one inner unit 85, containing a number of compartments 84, each compartment 84 holding one carrier 17. The compartments 84 are arranged in levels, at least one level, with a number of compartments 84 on each level, see example in FIG. 11b, and a number of levels on top of each other, see FIG. 11c. One or multiple tubes 14 are connected to the outer unit 86, see FIG. 7b. The inner unit 85 rotates around its own axis 87, and in case of multiple levels, also up and down its own axis to operate the called-upon compartment 84 to the opening to the called-upon tube 14. In this way, the complete unit could serve as both storage device and switching device (at least two tubes attached). An alternative embodiment could be to place one or multiple connection(s) to one or multiple tube(s) 14 on each level, thus reducing the need for the inner unit 85 to operate up and down its own axis.

The inner unit 85 may be designed in such a way that it can be detached from the system, in order to be transported as a transport unit in another system, or be operated as a carrier in itself in a tube-and-carrier system with a diameter larger than d. The system could be designed in such a way that the outer unit 86 is in itself a tube, where the inner unit 85 is operated using its own sensing and communication unit and is operated to stop upon demand at the cross-sections where the smaller tube(s) 14 connect.

Devices for extra storing capacity 30 may be located in close vicinity to the common/public user terminal 12 to allow quick delivery. Alternatively, or additionally, storage devices may be provided at strategic locations throughout the tube conveyor system 10, e.g. at the border of a residential area, a city district, an industrial area or similar.

The various embodiments described above are provided by way of illustration only and should not be construed to limit the invention. For example, the principles herein may be applied to any remotely controlled device. Those skilled in the art will readily recognize various modifications and changes that may be made to the present invention without following the example embodiments and applications illustrated and described herein, and without departing from the scope of the present disclosure.

Safety and Security

In contrast to current modes for transport of goods the system 10 uses its own dedicated conveyance infrastructure, which means no interaction with persons and vehicles 18 of other transport systems 8 while performing storing and transport functions. However, persons will interact with the systems at terminals. At transfer 11 and carrier service terminals 70 only specially trained personnel are allowed to be users in accordance with current praxis for tube-based systems. But in contrast to current praxis, the general public with no special training will interact at the user terminals 12. To mitigate the new safety risks these causes, the user terminals 12 are provided with doors 20 and locks 27 requiring authorization with an access device 21 to be opened and in most use cases means are in place, e.g. stop means 49 and holding means 46 to prevent the user from removing carrier 17 from the user terminal.

The risk caused by nature or antagonists are lower than for prior art but still important to mitigate in order to achieve high quality of the logistics services produced by the system 10. One such risk is gases or liquids from one goods item that that leaks from the carrier 17 and spoils another goods item. Another set of risks is caused by unauthorized opening of terminal door 20, carrier hatch 26, lid on goods item 66, or tampering with packaging 82 around the goods item 48.

Figure 10:
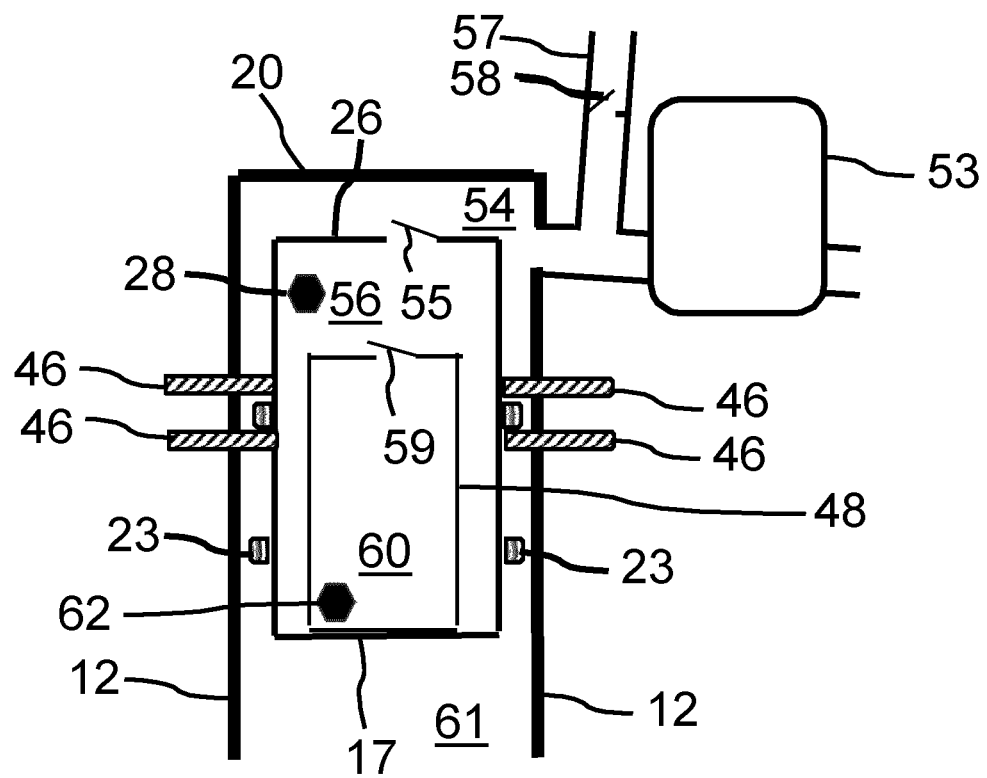
FIG. 10 is a schematic view of a device for vacuum sealing a carrier and a goods item at a terminal according to a further embodiment.

Since the logistics service system 10 is intended to be used for transporting and storing a broad spectrum of goods items in the carriers 17 it is important to prevent, immediately detect, and quickly take action to minimize the consequences if gases or liquids leak from the carriers or its door is opened without authorization. FIG. 10 depicts a device and method to prevent and detect leakage and opening of carriers. As in FIG. 4a-4c, the rods 46 hold the carrier in its lower position, the hatch 26 of the carrier 17 is closed, its lock is activated, and the door 20 of the terminal 12 is closed. The vacuum pump 53 evacuates some of the air inside the cavity 54 at end of the tube and in the cavity 56 inside carrier 17 to provide vacuum. A sensor in the sensing and communication unit 28 measures absolute air pressure in the cavity 56 inside the carrier 17. When a preset vacuum level is reached the valve 55 on the carrier 17 is closed and the valve 58 in the outlet 57 is opened. Rods 46 are moved to release the carrier 17, which is operated away from the terminal 12 by means of propulsion (not shown), e.g. by providing under-pressure in the cavity 61 inside the tube by electromagnets, or by wheels on the carrier or on the walls of the tube.

The sensing and communication unit 28 continuously monitors the air pressure and communicate with the control system. Loss of air pressure indicates leakage of gas into the carrier, e.g., due to an attempt to open or break into it. If it is a slow leakage, the carrier continues to its destination, but if it is a large and sudden leakage, actions are immediately taken, e.g. the carrier is moved to a carrier service terminal 70 and personnel are dispatched to the location where the leakage started to catch the antagonist and inspect the carrier and the tube.

As a complement or alternative, the goods item 48, which in this embodiment is a gastight container or bag 82 holding items inside, is provided with a valve 59 that is operated as the valve 55 of the carrier. The preset vacuum levels of the goods and the carrier may be different.

If the means of propulsion is air pressure, the whole tube system has gas tight walls and is set on under- or over-pressure when carriers are operated in it. By measuring air pressure in several places and outside carriers at each end, leakages and intrusion attacks on the tubes are immediately detected, as well as the condition of the sealing rings on the carriers and the fans of the propulsion system are assessed.

As an alternative to using gas pressure as leakage and tamper indicator, a specific mixture of gases is used. Then one or several gas sensors are used and no need to measure gas pressure or administer a gas pressure different from the pressure outside the pipe, carrier, or inner packaging.

The above leakage and tamper indication method can preferably be used from the moment when the goods item is loaded into the carrier or into the gastight packaging intended to be placed in a carrier, e.g. at the farm, factory, or trading company, all the way to the final consumer. Thereby ensuring that the goods item is safe to use and not fake, has not been manipulated with, that the carrier does not contain a bomb or pathogen, and has not been exposed to shocks, temperatures, or gas mix outside the prescribed ranges. Example of use cases are distribution of vaccine requiring a low temperature and with high risk to have been exchanged with counterfeits, fruits requiring an atmosphere with a specific mix of gases, and secret documents or prototypes.

The invention claimed is:

1. A logistics service system comprising:
    at least two tubes, at least one of which is connected to a terminal;
    at least one carrier configured to hold goods items to be handled in the logistics service system;
    at least one switching device arranged to connect at least two of the at least two tubes, and configured to redirect the carrier from one of the tubes into another of the at least two tubes;
    at least one means for propulsion of the at least one carrier in the tubes;
    at least one control unit;
    an acceleration arrangement that includes electromagnets provided on at least one place along the tubes and at least one permanent magnet provided on the carrier, the electromagnets and the permanent magnets being configured to interact in response to the control unit to accelerate, and/or decelerate, and/or rotate, and/or hold the carrier; and
    at least one turning device that includes at least one plate provided with electromagnets, the at least one plate being arranged in connection with the at least two tubes; wherein, when a carrier is located on the plate, the control unit is configured to actuate the electromagnets of the plate to interact with the permanent magnets of the carrier such that the carrier is turned to be aligned with at least one of the at least two tubes, or
    a turning sphere as a turning device, the turning device including an outer sphere, a middle sphere, and an inner sphere that are controlled by internal magnetic control devices, the turning sphere being arranged in connection with at least two tubes; wherein, when a carrier is located in the turning sphere, the control unit is configured to actuate the magnetic control devices to interact with the permanent magnets of the carrier such that the carrier is turned to be aligned with one of the at least two tubes based on information from the control unit;
    wherein all above are configured to produce logistics services that include both storing and transport functions.

2. The logistics service system according to claim 1, wherein the tubes are configured to be installable with other utility pipes and cables in a common outer enclosure and/or a vertical shaft in a building; and
    wherein the switching device is configured to be installable with other utility devices in a common outer enclosure.

3. The logistics service system according to claim 1, wherein the control unit further comprises:

a communication unit for communication with the carriers, with the control unit, and with a central control unit; and
wherein the control unit is configured to control
    routing and speed of carrier movements, and
    access to carriers.

4. The logistics service system according to claim 1 comprising:
    means for identifying and communicating with users of the system, users of the services of the system, and the goods items.

5. The logistics service system according to claim 1 comprising:
    a packaging designed to fit into an inner cavity of the carrier for specific types of goods items, or goods items with specific requirements.

6. The logistics service system according to claim 1, wherein the carrier comprises a hatch provided with a lock which is releasable by means of an access device, the lock being configured to be maneuverable when the carrier is located in a user terminal or in a transfer terminal.

7. The logistics service system according to claim 6, wherein the carrier comprises at least one sealing ring arranged around its circumference and perpendicular to a direction of travel of the carrier;
    wherein the user terminal is provided with at least a first holding device and a second holding device that are movable between an extended position and a retracted position;
    wherein, when the carrier is located in the user terminal, the sealing ring is configured to rest against the first holding device, being in its extended position, preventing the sealing ring and thus the carrier from moving in a direction past the first holding device, and the second holding device, being in its extended position, is configured to prevent the sealing ring and thus the carrier, from moving in an opposite direction past the second holding device.

8. The logistics service system according to claim 6, wherein the carrier comprises at least one sealing ring arranged around its circumference and perpendicular to a direction of travel of the carrier;
    wherein the transfer terminal is provided with at least a first holding device that is movable between an extended position and a retracted position;
    wherein, when the carrier is located in the transfer terminal, the sealing ring is configured to rest against the holding device, being in its extended position, preventing the sealing ring and thus the carrier from moving in a direction past the first holding device.

9. The logistics service system according to claim 1, wherein the tubes are arranged to transport both carriers and a fluid.

10. The logistics service system according to claim 9, wherein the carrier and the fluid are transported simultaneously in the tube; and
    wherein the fluid is used as the means for propulsion of the carrier.

11. The logistics service system according to claim 9, where the fluid is transported through the tubes, and at specific time slots, also carriers are transported through the tubes, separated in time and space.

12. The logistics service system according to claim 9, where the fluid is one of: air configured to be used for heating or cooling the interior of a building, gas for fire extinction, or gas for energy production.

13. The logistics service system according to claim 9, wherein, when the fluid is air configured to be used for heating or cooling the interior of a building, the air is transported in a first direction in the tube and in an opposite direction in the cavity of an enclosure in which the tube is arranged.

14. The logistics service system according to claim 9, wherein the fluid is water.

15. A method for providing logistics services with the logistics service system according to claim 1, the method comprising:
providing a goods item to the logistics service system;
assigning delivery details to a carrier;
inserting the goods item into the carrier; and
operating the logistics service system according to the assigned delivery details.

16. The method according to claim 15, wherein the delivery details are provided to the control unit by a user of the system, or a user of the service.

17. The method according to claim 15, wherein the step of assigning delivery details to a carrier is performed by identifying the ID of the carrier by means of one of a barcode or QR-code scanner, or an RFID chip reader, and associating the ID with the delivery details of the goods item.

18. The method according to claim 15, wherein the step of providing a goods item to the logistics service system comprises providing the goods item to a user terminal or to a transfer terminal.

19. The method according to claim 15, wherein the step of operating the logistics service system comprises one or more of: operating the carrier to a user terminal, to remain in motion or non-motion in the tube, to a storage device, to a transfer terminal, to a carrier service terminal, or operating the carrier to any position along an extension of the tube.

20. The method according to claim 19, wherein the step of operating the carrier comprises operating the carrier to a user terminal; and
wherein the method further comprises a step of transmitting a notification to a user of the service.

21. The method according to any of claim 20, further comprising the steps of identifying the user of the service, checking that the identified user of the service has the authority to retrieve the goods item, and subsequently unlocking a door of the user terminal and a hatch of the carrier.

22. The method according to claim 21, wherein data from sensors anywhere in the logistics service system are used by the control unit to determine where to preposition goods item, to make inference about when to take carriers out of the logistics service system for cleaning and proactive maintenance, and to make inference when to provide maintenance of system components.

* * * * *